US008817668B2

(12) United States Patent
Sekaran et al.

(10) Patent No.: US 8,817,668 B2
(45) Date of Patent: Aug. 26, 2014

(54) DISTRIBUTABLE, SCALABLE, PLUGGABLE CONFERENCING ARCHITECTURE

(75) Inventors: Dhigha D. Sekaran, Redmnd, WA (US); Shaun D. Pierce, Redmond, WA (US); Shaun D. Cox, Redmond, WA (US); Srikanth Shoroff, Sammamish, WA (US); Pavel Curtis, Bellevue, WA (US); David Nichols, Redmond, WA (US); Bimal K. Mehta, Sammamish, WA (US); Vadim Eydelman, Redmond, WA (US); Vijay Kishen Hampapur Parthasarathy, Sammamish, WA (US); Orit Levin, Redmond, WA (US); Gur Kimchi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 11/522,024

(22) Filed: Sep. 15, 2006

(65) Prior Publication Data

US 2008/0069011 A1 Mar. 20, 2008

(51) Int. Cl.
*H04L 12/16* (2006.01)
*H04L 29/06* (2006.01)
*H04L 12/18* (2006.01)
*H04M 3/56* (2006.01)

(52) U.S. Cl.
CPC ...... *H04L 29/06414* (2013.01); *H04L 12/1813* (2013.01); *H04L 12/18* (2013.01); *H04L 29/06027* (2013.01); *H04L 29/06176* (2013.01); *H04L 29/06421* (2013.01); *H04L 29/06428* (2013.01); *H04L 29/06442* (2013.01); *H04L 65/403* (2013.01); *H04M 3/56* (2013.01)
USPC ........... 370/261; 370/260; 370/270; 370/352; 370/390; 370/496; 370/522

(58) Field of Classification Search
None
See application file for complete search history.

(56) References Cited

U.S. PATENT DOCUMENTS 6,272,214 B1 8/2001 Jonsson
6,310,862 B1 10/2001 Roy
(Continued)

FOREIGN PATENT DOCUMENTS

DE 102004041882 3/2006
EP 1662434 5/2006
(Continued)

OTHER PUBLICATIONS

Roach, A.B. "RFC 3265: SIP Specific Event Notification." The Internet Society, 2002.*

(Continued)

*Primary Examiner* — Faruk Hamza
*Assistant Examiner* — Andrew Oh
(74) *Attorney, Agent, or Firm* — Andrew Smith; Jim Ross; Micky Minhas

(57) ABSTRACT

Architecture for a scalable, pluggable multi-party, and distributed multimedia conferencing. A centralized policy and control conferencing component allows the seamless plug-in of different distributed media components (e.g., data, audio/video, messaging) to accommodate client participation in a conference session. The centralized conference control component includes the following: a conference notification service for accepting subscriptions to the conference state and notifying subscribers about changes to that state; a conference policy and roster control service for storing and manipulating conference policy and rosters; a security service for user authorization/authentication based on user identity information; a scheduling service for conference scheduling; an allocation service for allocating the most available media component(s) for a conference session; and, an MCU management service for conference policy and roster management of the distributed media components.

20 Claims, 24 Drawing Sheets

(56) References Cited

U.S. PATENT DOCUMENTS

| | | | |
|---|---|---|---|
| 6,343,313 | B1 | 1/2002 | Salesky et al. |
| 6,408,327 | B1 | 6/2002 | McClennon et al. |
| 6,430,281 | B1 | 8/2002 | Morley |
| 6,438,111 | B1 | 8/2002 | Catanzaro et al. |
| 6,564,261 | B1 | 5/2003 | Gudjonsson et al. |
| 6,567,813 | B1 | 5/2003 | Zhu et al. |
| 6,584,493 | B1 | 6/2003 | Butler |
| 6,810,260 | B1 | 10/2004 | Morales |
| 6,876,734 | B1* | 4/2005 | Summers et al. ......... 379/202.01 |
| 6,901,448 | B2 | 5/2005 | Zhu et al. |
| 6,907,449 | B2 | 6/2005 | Srinivasan |
| 6,925,645 | B2 | 8/2005 | Zhu et al. |
| 7,043,528 | B2 | 5/2006 | Schmitt et al. |
| 7,107,312 | B2 | 9/2006 | Hackbarth et al. |
| 7,130,883 | B2 | 10/2006 | Zhu et al. |
| 7,174,365 | B1* | 2/2007 | Even et al. .................... 709/204 |
| 7,177,905 | B1 | 2/2007 | Slutsman et al. |
| 7,184,531 | B2* | 2/2007 | Crouch ................... 379/202.01 |
| 7,298,834 | B1* | 11/2007 | Homeier et al. ......... 379/202.01 |
| 7,353,251 | B1* | 4/2008 | Balakrishnan ................ 709/204 |
| 7,720,091 | B2 | 5/2010 | Faber |
| 7,830,824 | B2 | 11/2010 | Decker et al. |
| 7,987,233 | B1* | 7/2011 | Osborne et al. ............... 709/206 |
| 8,045,489 | B2 | 10/2011 | Lee et al. |
| 8,064,368 | B1 | 11/2011 | Jones et al. |
| 8,300,789 | B2 | 10/2012 | Shah et al. |
| 8,412,773 | B1* | 4/2013 | Chapweske et al. .......... 709/205 |
| 8,467,319 | B1 | 6/2013 | Jones et al. |
| 8,547,879 | B1 | 10/2013 | Jones et al. |
| 2002/0064136 | A1* | 5/2002 | O'Neil .......................... 370/267 |
| 2002/0091769 | A1* | 7/2002 | Drozdzewicz et al. ....... 709/204 |
| 2002/0136382 | A1 | 9/2002 | Cohen et al. |
| 2003/0014488 | A1 | 1/2003 | Dalal et al. |
| 2003/0021400 | A1* | 1/2003 | Grandgent et al. ...... 379/202.01 |
| 2003/0023690 | A1* | 1/2003 | Lohtia .......................... 709/206 |
| 2003/0167302 | A1 | 9/2003 | Zhu et al. |
| 2003/0182374 | A1* | 9/2003 | Haldar ......................... 709/205 |
| 2004/0047461 | A1 | 3/2004 | Weisman |
| 2004/0133696 | A1* | 7/2004 | Comstock et al. ............ 709/231 |
| 2004/0172656 | A1 | 9/2004 | Kim et al. |
| 2004/0221010 | A1 | 11/2004 | Butler |
| 2004/0246332 | A1* | 12/2004 | Crouch ...................... 348/14.08 |
| 2005/0018826 | A1 | 1/2005 | Benco et al. |
| 2005/0094579 | A1 | 5/2005 | Acharya et al. |
| 2005/0201303 | A1 | 9/2005 | Oliveira et al. |
| 2005/0226172 | A1 | 10/2005 | Richardson et al. |
| 2005/0256925 | A1 | 11/2005 | Luo et al. |
| 2006/0017805 | A1* | 1/2006 | Rodman .................... 348/14.02 |
| 2006/0047750 | A1 | 3/2006 | Schmitt et al. |
| 2006/0067250 | A1 | 3/2006 | Boyer et al. |
| 2006/0104221 | A1 | 5/2006 | Norton |
| 2006/0147009 | A1 | 7/2006 | Greenlee et al. |
| 2006/0200550 | A1 | 9/2006 | Nelson et al. |
| 2006/0233120 | A1* | 10/2006 | Eshel et al. ................... 370/260 |
| 2007/0002779 | A1 | 1/2007 | Lee et al. |
| 2007/0050448 | A1 | 3/2007 | Gonen et al. |
| 2007/0133438 | A1 | 6/2007 | Shaffer et al. |
| 2007/0162553 | A1 | 7/2007 | Dewing et al. |
| 2007/0203980 | A1 | 8/2007 | Anderson |
| 2008/0019300 | A1* | 1/2008 | Perzy et al. ................... 370/328 |
| 2008/0158337 | A1* | 7/2008 | Richardson ................ 348/14.09 |
| 2009/0179983 | A1 | 7/2009 | Schindler |
| 2011/0268418 | A1 | 11/2011 | Jones et al. |
| 2011/0270923 | A1 | 11/2011 | Jones et al. |
| 2011/0271197 | A1 | 11/2011 | Jones et al. |
| 2011/0271209 | A1 | 11/2011 | Jones et al. |
| 2011/0271210 | A1 | 11/2011 | Jones et al. |
| 2012/0246229 | A1 | 9/2012 | Carr et al. |

FOREIGN PATENT DOCUMENTS

| | | |
|---|---|---|
| JP | HEI 08-263398 | 10/1996 |
| JP | 2003-018303 | 1/2003 |
| JP | 2003-188998 | 7/2003 |
| JP | 2004-153352 | 5/2004 |
| JP | 2006-148479 | 6/2006 |
| JP | 2006-229416 | 8/2006 |
| RU | 2004125595 | 2/2006 |
| WO | WO 02/19620 | 3/2002 |

OTHER PUBLICATIONS

Bates, John, "A Framework to Support Large-Scale Active Applications", 1996, pp. 1-8, ACM Press, New York, US, http://delivery.acm-org/10.1145/510000/504452/p1-bates.pdf.

Bulut, et al., "Integration of NaradaBrokering and Audio/Video Conferencing as a Web Service", http://grids.ucs.indiana.edu/ptliupages/publications/AVOverNaradaBrokering.pdf.

Duarte, et al., "A Case Study on Event Dissemination in an Active Overlay Network Environment", 2003, pp. 1-8, ACM Press, New York, US, http://delivery.acm.org/10.1145/97000/966624/3-duarte.pdf?.

Australian Examination Report cited in Application No. 2007296792 dated Mar. 3, 2011, 3 pgs.

"Calling Features", Retrieved Dec. 24, 2010, http://www.cisco.com/en/US/docs/voice_ip_comm/cuipph/9971_9951_8961/8_0/english/user/guide/book/callfeat_rt902.pdf, 28 pgs.

Chinese first Office Action mailed May 7, 2011, Application No. 200780033969.7, 14 pgs.

"Conference Call Service", Retrieved Dec. 24, 2010, https://www.globaltelelinks.net/canada/conference.aspx, 3 pgs.

Duane et al., "A Case Study on Event Dissemination in an Active Overlay Network Environment"; 2003 ACM; 8 pgs.

"How to Use This Guide", Retrieved Dec. 24, 2010, http://www.ccs.uottawa.ca/internal/tel/401.pdf, 8 pgs.

"IMConferencing", 2007 LiveOffice LLC, cited in U.S. Appl. No. 12/014,075, 1 pg.

"On-Premise Web Conferencing", Retrieved Dec. 24, 2010, http://technet.microsoft.com/en-us/library/bb663723%28office.12%29.aspx, 7 pgs.

PCT Search Report cited in Application No. PCT/US2007/07765 dated Jan. 3, 2008.

Response to Australian Examination Report cited in Application No. 2007296792 mailed Jun. 28, 2011, 31 pgs.

"Run Microsoft Office Live Meeting Web Access", 2007 Microsoft Corporation; cited in U.S. Appl. No. 12/014,075, 3 pgs.

"Web Conferencing Services", 2006 ConferenceCall.com; cited in U.S. Appl. No. 12/014,075, 3 pgs.

"GoToMeeting", 1997-2007 Citrix Online, LLC.

Chinese Second Office Action mailed Apr. 1, 2012, Application No. 200780033969.7, 7 pgs.

Russian Notice of Allowance in Application 2009109214, mailed Feb. 8, 2012, 6 pgs.

U.S. Appl. No. 12/014,075, Office Action mailed May 8, 2012, 9 pgs.

Chinese Notice of Allowance mailed Jul. 5, 2012, Application No. 200780033969.7, 4 pgs.

Japanese Notice of Rejection in Application 2009-528397, mailed Aug. 17, 2012, pgs.

U.S. Appl. No. 12/014,075, Amendment and Response filed Sep. 10, 2012, 10 pgs.

U.S. Appl. No. 12/014,075, Notice of Allowance mailed Oct. 3, 2012, 5 pgs.

Australian Patent Examination in Application 2011253547, mailed Feb. 26, 2013, 6 pgs.

U.S. Appl. No. 13/052,884, Office Action mailed Feb. 25, 2013, 23 pgs.

Australian Notice of Allowance in Application 2011253547, mailed May 24, 2013, 2 pgs.

European Extended Search Report in Application 07841904.1, mailed May 21, 2013, 8 pgs.

U.S. Appl. No. 13/052,884, Office Action mailed Jul. 23, 2013, 23 pgs.

Japanese Notice of Allowance in Application 2009-528397, mailed Jul. 5, 2013, 6 pgs.

U.S. Appl. 13/052,884, Amendment and Response filed May 28, 2013, 17 pgs.

(56) References Cited

OTHER PUBLICATIONS

U.S. Appl. No. 13/052,884, Amendment and Response filed Oct. 23, 2013, 17 pgs.

U.S. Appl. No. 13/052,884, Office Action mailed Dec. 17, 2013, 23 pgs.

Korean Notice of Preliminary Rejection in Application 10-2009-7005060, mailed Sep. 27, 2013, 6 pgs.

U.S. Appl. No. 13/052,884, Amendment and Response filed Mar. 17, 2014, 15 pgs.

Canadian Exam Report in Application 2660874, mailed Jun. 10, 2014, 3 pgs.

* cited by examiner

DISTRIBUTABLE, SCALABLE, PLUGGABLE CONFERENCING ARCHITECTURE

BACKGROUND

Technological advances in computing devices and networking continue to provide greater access to a wide variety of information and services allowing access from virtually anywhere in the world. Virtual offices are becoming more commonplace since the work that needs to be done can be performed from most locations.

Network operators and providers (both cellular and non-cellular) spend enormous amounts of money and resources in infrastructure to support the many types of portable devices and media now in existence and that will be marketed in the future. For example, cellular operators are scrambling to provide the infrastructure which allows a cellular customer to access IP networks (e.g., the Internet) and associated IP services via the cellular network. Thus, a cellular customer can now access information that is available on the IP-based networks. Similarly, computing devices can conduct conversations over IP networks, and even connect to cellular users.

Businesses still recognize the importance of meetings to effectively more products development forward, for example. However, bringing users together to conduct business from the many remote locations at which they could be and supporting the many available communications devices and media types remains a challenging prospect.

Conferencing can be an effective means by which employees of a corporate enterprise, for example, can conduct meetings. However, given the location and connection capabilities at any point in time, participants may want to join via different media types. With the advances in storage and computing power of portable wireless computing devices, users now are capable of interacting with many types of disparate data types such as images, video clips, audio data, and textual data, for example. Moreover, the user can typically have several types of devices with which to connect to the session. For example, one user can participate by audio/video from a conference room, another by voice via a desktop computer, and yet another by text input using a cell phone.

Such disparate media capabilities have traditionally been addressed at the server level by consolidating media processing capabilities locally. However, this is problematic in that more resources are required to administer such systems and these systems are more difficult to scale to meet conferencing demands.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed herein is architecture that describes a scalable, pluggable architecture for multi-party, multimedia conferencing. Framework is provided for a centralized policy and control component that allows the seamless plug-in of different distributed media components such as multipoint control units (MCUs). The conference architecture supports multiple pluggable distributed media components for disparate media types (e.g., data, audio/video, instant messaging) for client participation in the session.

For example, on order to meet a conferencing need, a client accesses (e.g., via an Internet connection) a centralized control component, also called a focus, requesting that a conference session be created, scheduled, or for participation in a current session. The control component includes the capability to connect to and allocate the appropriate media interface (e.g., audio, video, data) for the client, configure the media interface to meet the requested client media type, provide session management of the conference session and, manage closeout and cleanup of the session for all associated clients and systems.

The centralized conference control component also provides scheduling services and creation of a session instance (via a focus factory). The conference controller also includes functionality to allocate one or more of the most available distributed media components (via a media factory) for a conference session. The conference control component also functions as a conference policy and roster control service. A conference policy server is a logical function which can store and manipulate the conference policy and rosters. The conference policy is the overall set of rules governing operation of the conference, and can be broken down into membership policy and media policy.

The conference control component includes a conference notification service which is a logical function that allows the focus to act as a notifier, accepting subscriptions to the conference state, and notifying subscribers about changes to that state. State includes the state maintained by the focus itself, the conference policy, and the media policy, for example. The conference control component also functions to provide session security via user authorization and/or authentication services based on identity information and/or a PIN. The centralized conference controller also interfaces to the distributed media components (e.g., MCUs) for conference policy and roster management services. The conferencing architecture provides conference participants with a single conference picture using a single integrated roster from the focus and can by controlling the conference through this focus.

In support thereof, the architecture disclosed and claimed herein comprises a computer-implemented conferencing system that includes a conference control component for centralized control of a conference session, and a distributed media component for interfacing a client to the conference session using a media type. The media component can be anywhere (e.g., the Internet) thereby allowing access via HTTP, for example. The centralized controller does not need to know anything about the distributed media component.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 12 illustrates an exemplary call flow diagram for a client joining via a data collaboration MCU by addUser dial-in.

FIG. 15 illustrates an exemplary call flow diagram for an ad hoc invitation to another client participant resulting in a dial-in.

DETAILED DESCRIPTION

Figure 1:
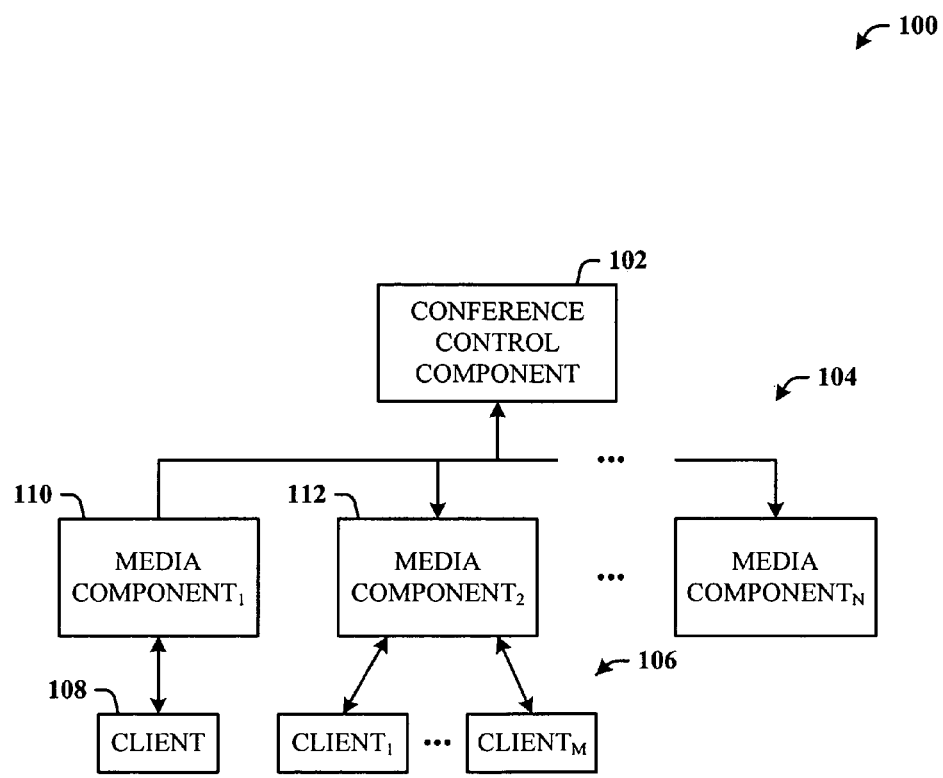
FIG. 1 illustrates a computer-implemented conferencing system for distributed media access.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed architecture is a scalable, pluggable architecture for multi-party, multimedia conference sessions. A centralized policy and control conferencing component allows the seamless plug-in of different distributed media components (e.g., data, audio/video, messaging) to accommodate client participation in a conference session. The centralized conference control component includes the following: a conference notification service for accepting subscriptions to the conference state and notifying subscribers about changes to that state; a conference policy and roster control service for storing and manipulating conference policy and rosters; a security service for user authorization/authentication based on user identity information; a scheduling service for conference scheduling; an allocation service for allocating the most available media component(s) for a conference session; and, an MCU management service for conference policy and roster management of the distributed media components.

Referring initially to the drawings, FIG. 1 illustrates a computer-implemented conferencing system 100 for distributed media access. The system 100 is a pluggable conferencing architecture that supports multiple pluggable distributed media systems for access by session participants via a variety of different devices. In support thereof, the system 100 includes a network-based conference control component 102 for centralized creation and control of a conference session. The control component 102 of the system 100 interfaces to manage one or more distributed media components 104 (denoted MEDIA COMPONENT$_1$, . . . , MEDIA COMPONENT$_N$, where N is a positive integer) such as multipoint control units (MCUs) that further provide client access to the conference session by clients 106 (denoted CLIENT, and CLIENT$_1$, . . . , CLIENT$_M$, where M is a positive integer) via similar and/or disparate media modes (e.g., audio, video).

An MCU is a system that facilitates connection of and management for one or client media types. The media is exchanged directly between the client and the MCU. Conventional systems do not employ MCUs that comprise at least the distributed capabilities of MCUs provided in accordance with the disclosed novel architecture.

In other words, in order to fulfill a conferencing need, a client 108 accesses (e.g., via an Internet connection) the control component 102 requesting that a conference session be created. The control component 102 facilitates allocation of the appropriate media components 104 (e.g., media components 110 and 112) for the session participants (e.g., client 108 and CLIENT$_1$, CLIENT$_2$, and CLIENT$_3$) and their desired connection type (e.g., audio, video, . . . ), interface management of the media components 104, configuration of the one or more media components 104 in order to meet the conferencing needs requested, session management during the session and, closeout and cleanup of the session for all associated systems.

Figure 2:
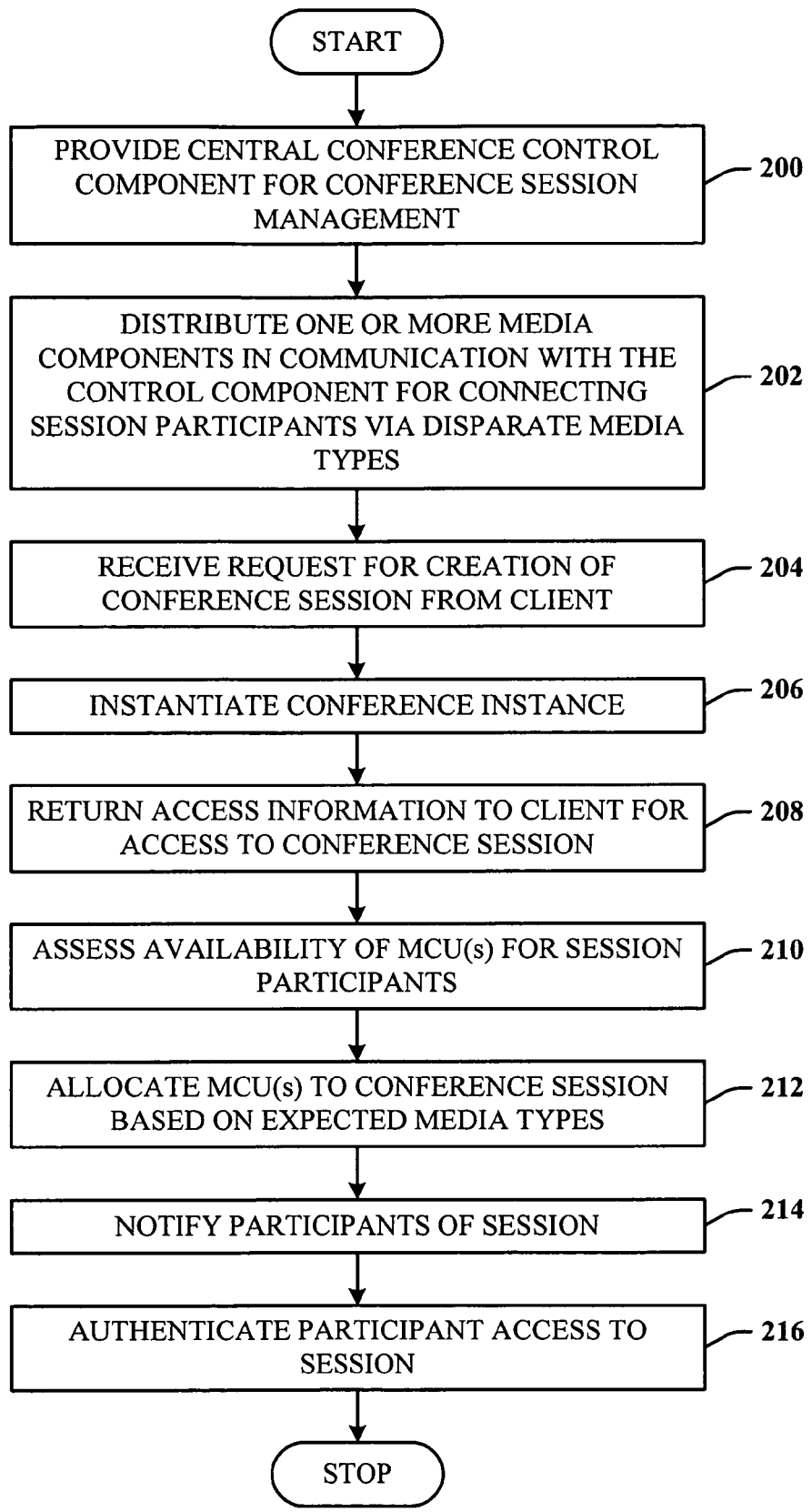
FIG. 2 illustrates a methodology of managing a conference session using distributed media components in accordance with the disclosed conferencing architecture.

FIG. 2 illustrates a methodology of managing a conference session using distributed media components in accordance with the disclosed conferencing architecture. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a central conference control component is provided for conference session management. At 202, one or more media components (e.g., MCUs) are provided in a distributed and addressable manner by the control component for connecting session participants via same or disparate media types (e.g., instant messaging, audio). At 204, a request is received for a client for creation of a conference session. At 206, the control component instantiates a conference instance. At 208, access information is returned to the client for accessing the session. At 210, the control component assesses availability of the media components for supporting the participants and the requested participant media types. At 212, the control component allocates one or more of the media components for the expected session media types. At 214, participants are notified of the session. At 216, the control component facilitates security processing by authenticating participant access to the session.

Figure 3:
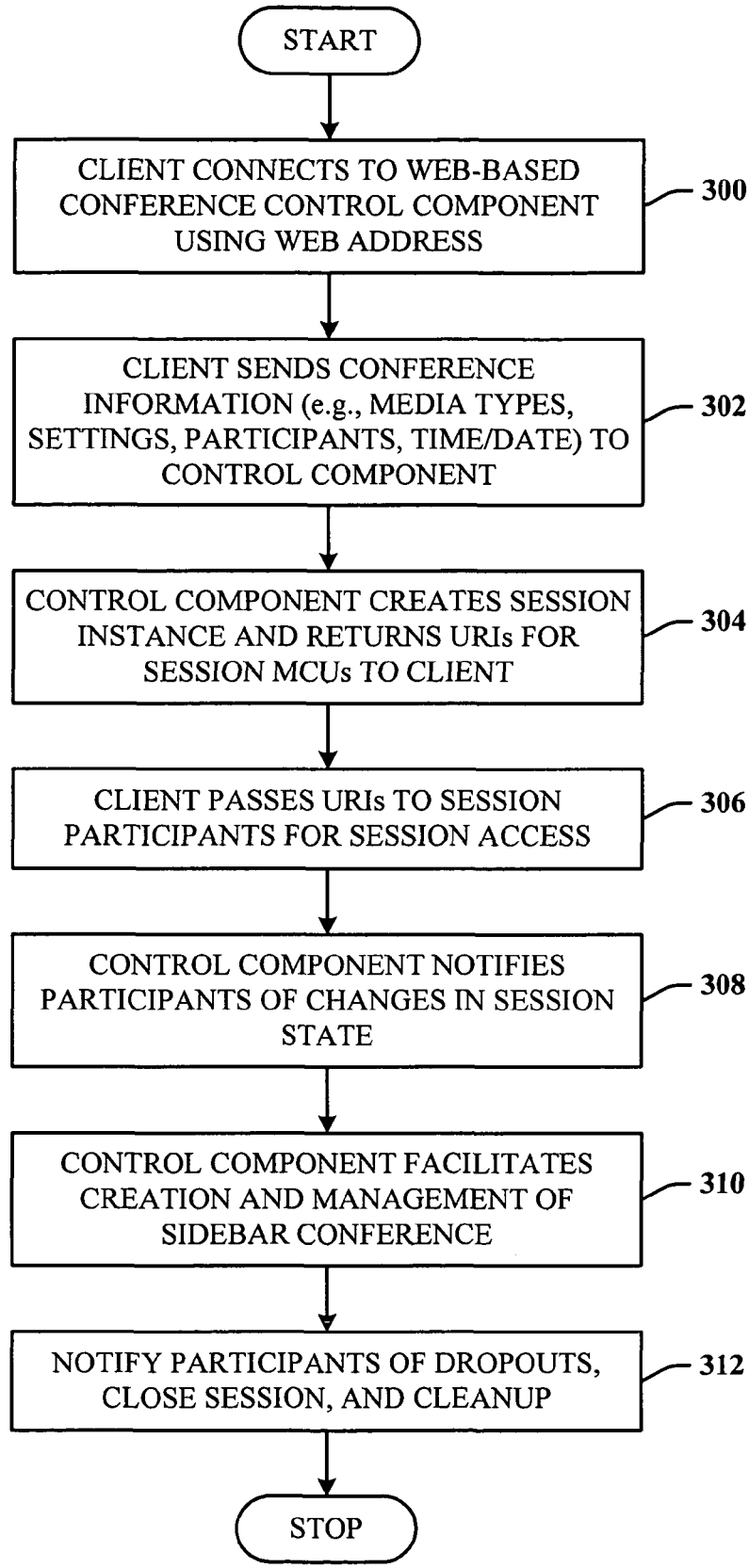
FIG. 3 illustrates a more detailed methodology of session management.

FIG. 3 illustrates a more detailed methodology of session management. At 300, a client connects to a web-based conference control component using a web address. At 302, the client sends conference information to the control component. This information includes setup and configuration information for the session such as participant information, time and data of the session, and media types to support participant access, for example. At 304, the control component creates a session instance and returns a URI (uniform resource identifier) for the session, and one or more URIs to the media components allocated for the session. At 306, the client passes the URI information on to the participants. The session begins and, at 308, participants are notified of changes in the session state. At 310, the control component facilitates creation and termination of a sidebar conference during the session. At 312, session participants are notified of session dropouts (participants who leave), the session is closed, and the system performs cleanup (e.g., closing out the MCUs, session instance, etc.).

Figure 4:
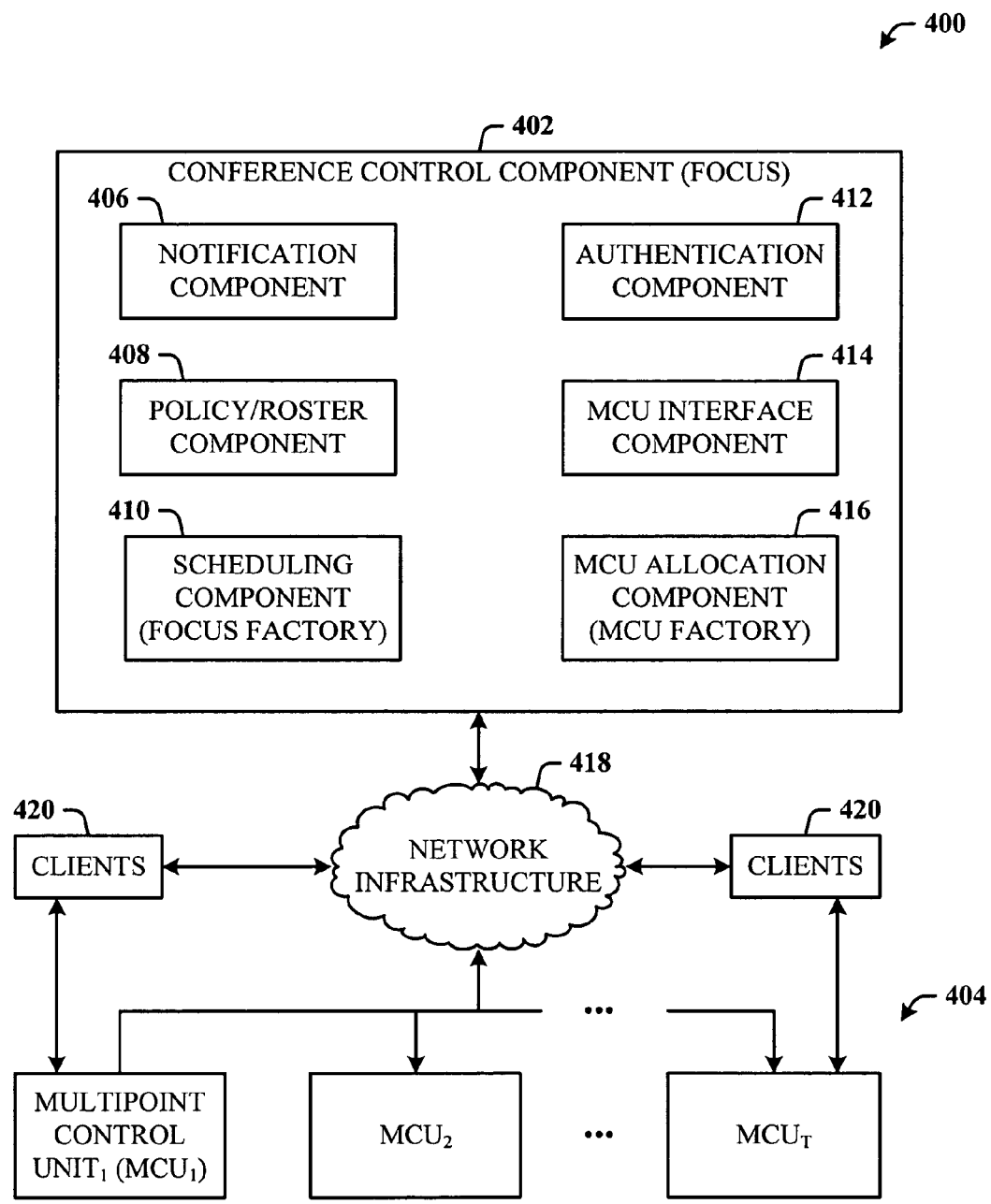
FIG. 4 illustrates a more detailed block diagram of a system that facilitates creation of a conference session using a web-based conference control component and distributed media components.

Referring now to FIG. 4, there is illustrated a more detailed block diagram of a system 400 that facilitates creation of a conference session using a web-based conference control component 402 and distributed media components 404. The system 400 includes the conference control component 402 (also referred to herein as a focus component) which is a centralized conference controller. The focus component 402 includes a notification component 406 that provides a conference notification service. The conference notification service is a logical function provided by the focus component 402. The focus component 402 can act as a notifier by accepting subscriptions to the conference state and notifying subscribers (or participants) about changes to that state.

The focus component 402 also includes a conference policy/roster component 408 for providing policy and roster control services. A conference policy server, as part of the component 408, is a logical function that can store and manipulate the conference policy/roster. The conference policy is the overall set of rules governing operation of the conference, and is broken down into membership policy and media policy. The state monitored by the notification component 406 includes the state maintained by the focus component 402 itself, the conference policy, and the media policy.

The focus component 402 also includes a scheduling component/focus factory component 410 that enables the scheduling of conferences. An authentication component 412 provides for user authorization and authentication processing based on identity (e.g., active directory) or using a PIN. An MCU interface component 414 facilitates interfacing to a plurality of the distributed media components 404 (e.g., MCUs 404) (denoted $MCU_1, MCU_2, \ldots, MCU_T$, where T is a positive integer) for conference roster/policy management. The focus 402 includes an MCU allocation component (also referred to as an MCU factory) 416 the function of which is to allocate the most available network-based MCU(s) 404 of a network 418 (e.g., the Internet) for the conference session. The system 400 also includes pluggable conference participants (denoted as CLIENTS 420) who get a single conference picture with a single integrated roster from the main focus and can control the conference through this focus.

Figure 5:
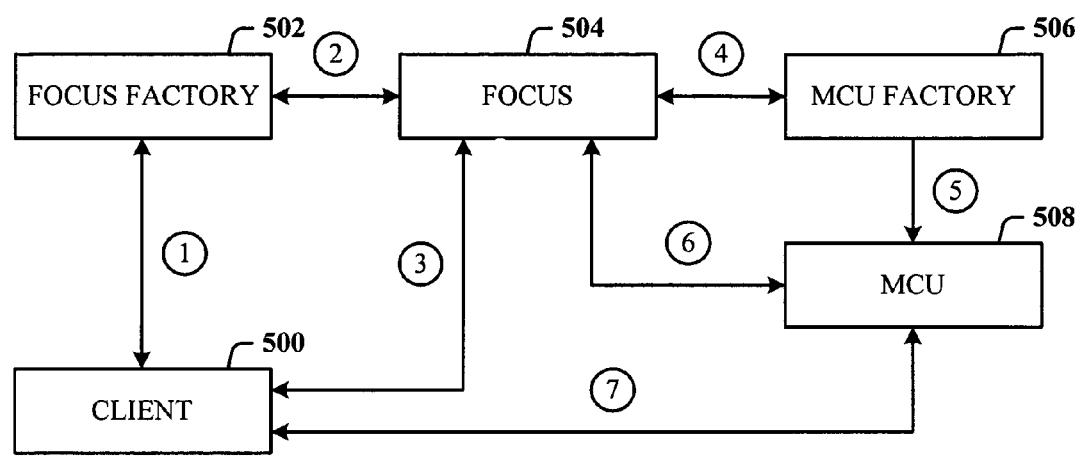
FIG. 5 illustrates a data flow among participants where an intranet client interacts with them to create and join a conference.

FIG. 5 illustrates a data flow among participants where an intranet client interacts with them to create and join a conference. In the disclosed centralized conferencing architecture there is a single (or main) focus visible to all conference participants. This focus is a single central signaling point for the participants in the same conference. Each conference is identified by a unique SIP (session initiation protocol) routable conference URI. Typically, this URI routes to a focus being implemented by the MCU, hosting the conference.

In order to provide improved user experience, the system introduces a concept of a main focus, where all conference URIs route to the main focus. Client users are authorized to participate in conferences by the focus, they get the notifications about the changes in the state of the conference from the focus, and all the conference control operations are issued by the clients to the main focus.

Components of the architecture are the client 500, focus factory 502, focus 504, MCU factory 506, and MCU 508. One of the main characteristics of the disclosed conferencing architecture is the use of multiple components that operate in a distributed manner, rather than a conventional monolithic server architecture.

The conference client 500 is an endpoint capable of joining and participating in a conference. The client 500 first interacts with the focus factory 502 to create a conference.

The focus factory 502 is the entity that creates a focus 504 for a conference. The focus factory 502 points the client 500 to an appropriate focus location where the conference will be held. The focus factory 502 is an application that runs on a SIP frontend machine as a SIP endpoint, and which is addressable with a SIP URI.

The focus factory 502 is SIP addressable as well as addressable using HTTP (hypertext transport protocol) and SOAP (simple object access protocol) URIs. In one architecture implementation, the focus factory 502 is collocated with the focus 504; in another, it is not collocated therewith. Each conferencing pool can be looked upon as a focus factory.

The focus 504 is the centralized policy and state manager for a conference session. The focus 504 is a SIP endpoint that represents a conference and acts as the central coordinator for all aspects of the conference. The focus 504 is responsible for enforcing the conference control policy, managing the overall security for a conference, notifying conference state updates to the client(s), and providing a conduit for control commands to flow between the client 500 and MCUs 508.

The focus 504 also interacts with an MCU for each media type that is part of a conference on behalf all the clients. The focus 504 stores all of the state needed to answer queries about a conference or state required to revive a meeting should one a frontend server fail. Conference information can be persisted in the SQL (structured query language) server database for future use until session cleanup. A focus instance runs on a conferencing pool. This allows the clients to connect to any frontend server in the pool, thereby allowing better availability, distribution of load, and better scaling. The focus 504 is also responsible for bootstrapping MCUs and maintaining connections to MCUs over an HTTP interface, for example. The focus 504 can also act as a proxy to proxy C3P (or CCCP—conference control channel protocol) commands and notifications, in some cases. This is described infra.

The concept of a focus is central to a SIPPING-compliant conference. SIPPING is an IETF (Internet Engineering Task Force) working group chartered with defining conferencing extensions to SIP. SIPPING's charter is to define conference state event packages schema.

The MCU factory 506 is a SIPPING concept, and allocates an MCU 508 to a conference session for a specific media type. The MCU factory 506 is responsible for provisioning a conference for a particular media type on an MCU 508 using the local policies for creating conferences. The MCU factory 506 can also take into account the current load on the MCUs before assigning an MCU to a conference. In one implementation, there can be one MCU factory 506 per media type.

The MCU 508 is responsible for managing one or more media types. In one scenario of the disclosed architecture, all conference control commands are sent by clients 500 to the focus 504, which then relays these commands to the appropriate MCU(s) 508 after verifying that the client 500 which sent the request has the privileges to perform that operation. The media is then exchanged directly between the client 500 and MCU 508.

MCU types can include a data collaboration MCU, audio/video MCU, IM (instant messaging) MCU and an ACP (audio conferencing provider) MCU. Suitably designed third-party MCUs can plug-in to the architecture to enhance the participant experience, for example, for audio/video enhancements. The architecture allows adding other MCUs easily as desired in future. For example, a suitably designed MCU can be provided for application sharing or chat.

Following is a more detailed outline of the data flow, which includes communication channels, semantics and type of the data that is exchanged between the components.

The client/focus factory communication of FIG. 5 (denoted by ①) begins by the client 500 first locating the focus factory 502. The client application communicates with the focus factory 502 to start a new conference. As explained above, since the client application acquires the focus factory URI when the user signs on, the client 500 has the means to communicate with the focus factory 502 at any time to start a new ad-hoc conference. The client 500 does not care on which server of a server pool, for example, the focus factory 502 is located; it only needs the focus factory SIP URI to connect.

In the disclosed framework, to create a conference means creating and configuring a focus instance. The job of the focus factory 502 is to return a URI of a focus 504 back to the client 500. This means that the conversation between the client 500 and the focus factory 502 does not have to be long lived, but only sufficiently long to last until the focus URI is returned to the client 500. The focus factory 503 creates (if necessary) and configures the focus 504, before it returns the focus URI back to the client 500.

The client 500 can pass all the information that it needs regarding the conference role definitions, media types, privileges, participants to the focus factory 502 upfront so the focus factory 502 can return a success response with the final data.

With respect to focus factory/focus communications of FIG. 5 (denoted by ②), upon receiving a request from the client 500, the focus factory 502 creates the focus 504 and returns a focus URI to the client 500 (denoted by ③). The focus 504, just like the focus factory 502, is a SIP endpoint represented by an application. The focus factory 502 redirects the request that it receives from the client 500 to the focus 504, allowing the focus 504 to become the endpoint that performs the media negotiation with the client 500. After passing the focus URI to the client 500, the focus factory 502 does not have to hold on to any state or do any work.

The MCU factory 506 is the logical entity that provides access information for the MCU 508. The MCU factory 506 can be a vendor-specific implementation for vendors of MCU devices or software. The focus 504 knows through settings what MCU factories are present in the system and what media types they support. Accordingly, the focus 504 asks the MCU factory 506 for information about how to contact an MCU 508 (denoted by ④) and the MCU factory 506 returns that information based on whatever internal logic it may be running (denoted by ④).

When the MCU factory 506 is requested to provide an MCU 508 to the focus 504 (denoted by ④), it finds out which MCU 508 is best suited to answer this request and returns a URL (universal resource locator) for that MCU 508. Each MCU can be published (e.g., in an active directory), allowing all MCU factories 506 in the topology to be able to find available MCUs of a kind.

Each MCU 508 publishes their HTTP address for control in the active directory as well. This address is what is passed to the focus 504 when the MCU factory 506 allocates an MCU resource 508. Before the URL is passed to the focus 504, however, the MCU factory 506 tries to provision a conference on the MCU 508 (denoted by ⑤). If the MCU's response is positive, then the URL is returned to the focus 504.

The focus 504 can then communicate with the MCU 508 (denoted by ⑥) using HTTP as a transport. Payload for requests and responses can be XML documents. The client 500 communicates with the MCU 508 (denoted by ⑦) via a signaling protocol and a media protocol. For audio/video MCUs, the signaling protocol is SIP media, and can be carried over RTP/RTCP. For the meeting MCU, both signaling and media can be carried over HTTP as a transport using a PSOM protocol.

Figure 6:
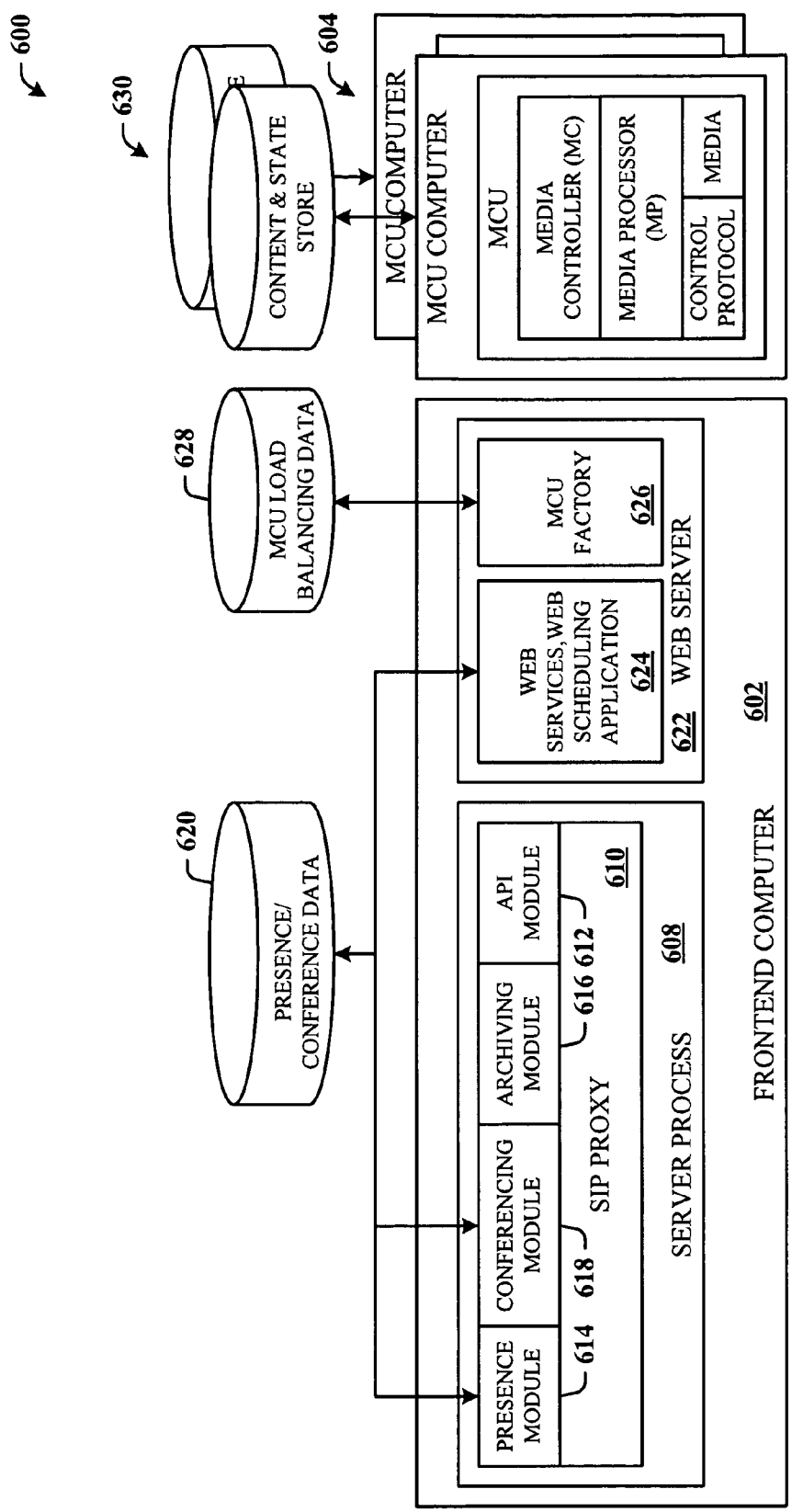
FIG. 6 illustrates an exemplary detailed diagram of component architecture for an implementation of a conferencing system.

FIG. 6 illustrates an exemplary detailed diagram of component architecture for an implementation of a conferencing system 600. The system 600 includes a frontend computer 602, a storage system 604, and distributed media components 606. The frontend computer 602 includes a server process 608 that functions as a SIP proxy 610. In addition to acting as SIP proxy and router, the server process 608 also provides an internal API (called extension modules API) 612 that is used by a presence (and registrar) server (or module) 614, an archiving agent module 616 and SIP API module 618. As shown, all of these extension modules 612 can run in the same process. No third party code needs to be run in the SIP proxy process 610.

The presence/registrar module 614 provides registrar and presence functionality. The presence and registrar module 614 manages all registration information and presence information in an SQL server database (or MSDE).

The combination of the SIP proxy and the associated extension modules is referred to collectively as the server frontend.

As indicated, the functionality of a frontend is enhanced to include conferencing features via a conferencing module 618 (also referred to as a conference manager). The conference manager 618 is a server component that provides the signaling and conference management functionality. The main elements of the conference manager 618 are the focus and the focus factory.

As indicated supra, the focus is a SIP endpoint that represents a conference. It is responsible for managing the state of the conference, enforcing security, managing roles and privileges, and providing conference state updates to the client(s) (not shown). The focus also interacts with an MCU for each media type that is part of a conference on behalf all the clients.

A conference database 620 contains information about each of the conferences provisioned on the server 602. This includes information about the conference ID, passwords and/or PINs associated with the conference, start time and end time (if any), roles and privileges, etc. The database 620 also includes information about a running conference for recovery from focus failures. The presence/registrar information and the conferencing information can be different tables of the same physical database (e.g., the conference database).

Each MCU is responsible for managing one or more media types. In one implementation, all conference control commands are sent by the clients to the focus, which then relays these commands to the appropriate MCU(s), after verifying that the client which sent the request has the privileges to perform that operation. The media is then exchanged directly between a client and MCU.

The MCU consists of two logical pieces: a media controller (MC) and a media processor (MP). The media controller is responsible for managing the control commands between a focus and an MCU. The media processor is responsible for media management such as mixing, relaying, transcoding, for example. Where an MCU is a data collaboration MCU, the media processor is a sophisticated software component that is responsible for managing the entire data collaboration experience. Each MCU can store its content and state information in associated storage units for retrieval if faults and/or failure occur.

Where the MCU is an audio/video MCU, the media processor has very specialized knowledge about mixing audio and video streams, stitching video streams, down-converting the media for clients who are on slow links, and so on. Of all the conferencing components, the media processor can be the most CPU and network intensive component. Accordingly, MCUs are operational on a physical computer different from the conference manager, which also provides for scaling. In one implementation, a media controller and media processor are collocated on the same machine to simplify deployment. In an alternative implementation, the media controller and media processor are located on the different machines 604.

The frontend computer 602 can also run a web server 622 that includes web services and a web scheduling application 624, and an MCU factory 626. As indicated previously, the MCU factory 626 is responsible for provisioning a conference for a particular media type on an MCU using the local policies for creating conferences. The MCU factory 626 can also take into account the current load on the MCUs before assigning an MCU to a conference. Load balancing data can be stored on a load balancing database 628. In this particular implementation, there is one MCU factory per media type. However, in an alternative implementation, one MCU factory is suitably robust to handle multiple different media types.

Web collaboration features can be provided by a data collaboration MCU. The data collaboration MCU is designed on "PSOM" technology. The data collaboration MCU support features such as presentation software documents, word processing and spreadsheet documents, chat, voting, white boarding, and application sharing, for example.

An audio/video MCU provides multi-party audio and video mixing and relaying capabilities, built on industry standard RTP (realtime transport protocol) and RTCP (RTP control protocol). Other MCUs can be designed and provided such as an Instant Messaging (IM) MCU and ACP MCU, for example.

The web server 624 provides a scheduling application (e.g., ASP.NET) for scheduling online conferences. The application uses the web service APIs for provisioning conferences and for managing conference policies. The database used for the web scheduler calendaring can be the focus/conferencing database 620. Content and state for the MCUs can be stored on local data stores 630.

Services can also be provided for rich store and views for managing ongoing meetings using meeting metadata like agendas, action-items, follow-ups, documents associated with the shared work space, etc.

Authentication can be made an integrated part of the conferencing architecture. In one implementation, a user's login credentials can be used for automatically authenticating the user (e.g., a single sign-on). Forms authentication can also be provided (e.g., username and password) for web-style forms where the user enters their username and password explicitly. Authorization can be enforced based on an opaque that is securely transmitted by the client to the servers after the initial authentication handshake. Strong encryption of the transport channel from client to the servers (e.g., 128-bit encryption) can also be imposed.

Web conferencing can involve having an online meeting with users who may not have an account in the service or enterprise. These one-off meetings are fairly common. Authentication of one-off conference participants can be supported by assigning a unique password for each session that gets communicated to the potential participants through out-of-band means like e-mail.

There are several situations where authorization can be made requirement in a conferencing application. Conferences take up resources on the server/service. Hence, forced authorization can be imposed before users are allowed to create conferences. In another example, within a given conference, all users do not have all privileges. For example, a certain subset of users is allowed to present and talk in the session while a different subset of users is allowed to listen only. In another example, not all users in a conference are allowed to invite other users to join. There are conference control actions such as mute/unmute of the conference, mute/unmute a specific user, or remove a user from the conference, etc. Each of these actions can be made to first require a privilege or permission.

The set of users with these privileges can be different for each of the conferences. Each conference potentially has a different membership and even when a user is authorized to participate in multiple conferences, this user may have different privileges in each of these conferences. For this reason, it is simpler to define a set of "roles", associate a set of "privileges" with these roles and then let creators of conferences assign users to each of these roles. For example, there can be an "organizer" role, a "presenter" role and an "audience" role. A user creating a conference will not have to specify what privileges each of these roles has. The privileges for a role can be pre-configured by the conferencing server administrator. The names of the roles can be chosen to be suggestive (or intuitive) of the kind of privileges they are likely to have.

Figure 7:
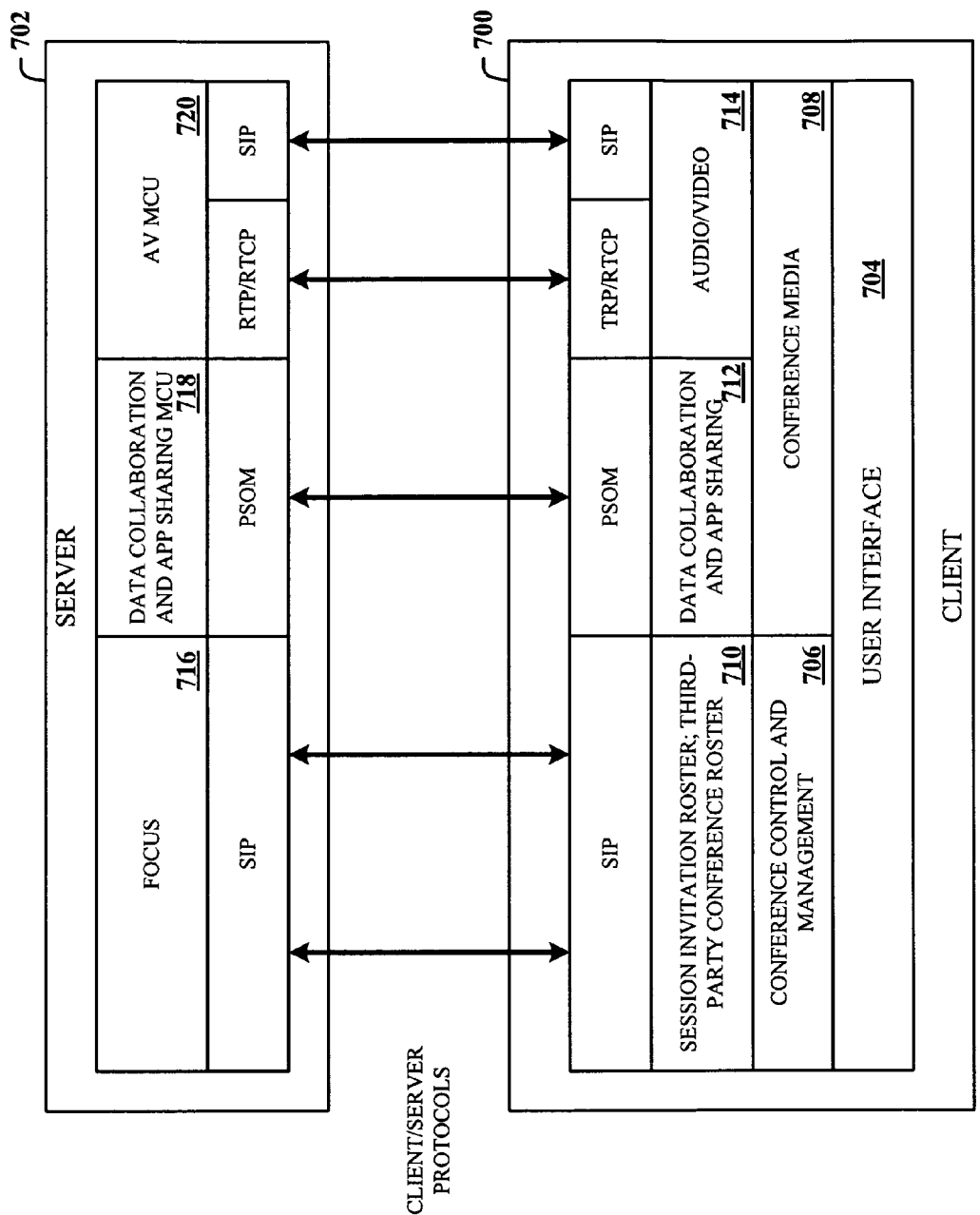
FIG. 7 illustrates a diagram of exemplary server architecture and protocols for conferencing and distributed MCUs.

FIG. 7 illustrates a diagram of exemplary server architecture and protocols for conferencing and distributed MCUs. Multiple protocols can be used between a client 700 and a server 702, each for a different purpose. The client 700 is shown having a user interface 704 that can access an underlying conference control and management component 706 and a conference media component 708. The management component 706 can access a roster component 710 that provides a session invitation roster and/or third-party conference roster. The conference media component 708 facilitates access to a data collaboration and application sharing component 712 and an audio/video component 714.

The server 702 includes a focus component 716, a data collaboration and application sharing MCU component 718, and an audio/video (AV) MCU component 720. The client 700 and server 702 include protocol interface components (e.g., SIP, PSOM, RTP/RTCP) for using various protocols. The client/server SIP components utilize a signaling and control protocol for session setup and conference management. In this particular implementation, SIP (e.g., as specified in RFC 3261) is utilized for call setup and termination. Additionally, the same conference session can be used for conference policy control and third party control using SIP-CX extensions. In one implementation, SIP-CX commands are tunneled over SIP-INFO. In another implementation, C3P control protocol commands can be employed. In yet another implementation, a standardized transport and protocol for conference policy control can be utilized from XCON, an IETF working group for centralized conferencing. SIP can use TCP (transmission control protocol) or TLS (transport layer security) as the underlying transport layer.

A separate SUB-NOT dialog can be used for subscribing to the conference packages and getting notifications when the state changes. The roster for the conference can be driven based on this SUB-NOT dialog. PSOM can be the media protocol for data collaboration and can use TCP or HTTP as the underlying transport.

For each media in the conference, a media transport will be used. RTP and RTCP can be used to provide audio/video functionality. RTP/RTCP can be run on UDP (user datagram protocol) where UDP connectivity is available between the client 700 and server 702. If there is no UDP connectivity, RTP/RTCP can be tunneled over TCP or HTTP. Other media protocols can be used for other media types. For example, chat can be supported on MSRP (message sessions relay protocol) and application sharing on RDP (remote desktop protocol). Each of these can be run as a separate media type. In another implementation, both of these protocols can be implemented on top of PSOM.

FIGS. 8-18 illustrate call flow diagrams for creating a conference, dialing in to a conference, joining a media session with an AV MCU by dialing in and dialing out, performing an ad hoc invitation to a participant, and joining a collaboration session via a data MCU.

The client application communicates with the focus factory to start a new conference. To create a conference means creating and configuring a focus instance. The focus factory's job is to return a URI to a focus back to the client. This communication between the client and the focus factory does not have to be long lived. It only needs to last until the focus URI is returned to the client. The focus/conference URI is constructed to include a unique conference identifier, a unique server identifier, and domain which hosts the conference in the user information part, for example, organizer@domain.com;ms-app=conf;ms-conf-id=11.

Figure 8:
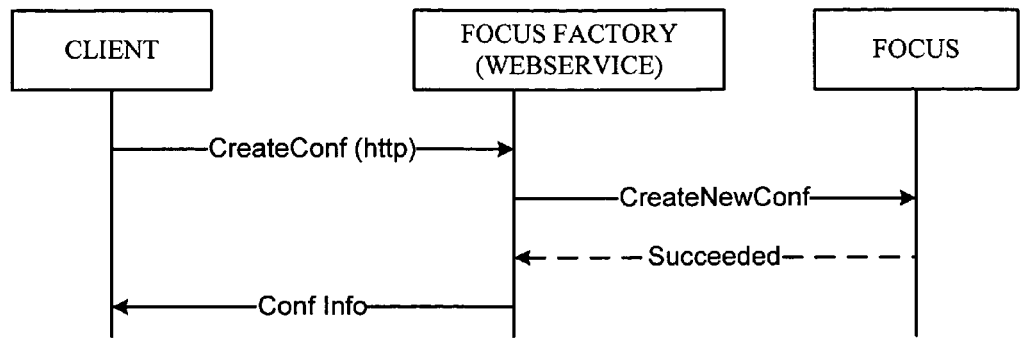
FIG. 8 illustrates an exemplary call flow diagram for initiating creation of a conference via a web interface/service.

There are three ways in which a client can create a conference: via a web service, a SIP Invite mechanism, and a SIP Service mechanism. FIG. 8 illustrates an exemplary call flow diagram for initiating creation of a conference via a web interface/service. The client connects to a known focus factory web URI and uses the exposed web interfaces to create a focus. After the successful creation of the focus, the webpage will point the client to the necessary information to launch the conference client to dial in to the conference.

Figure 9:
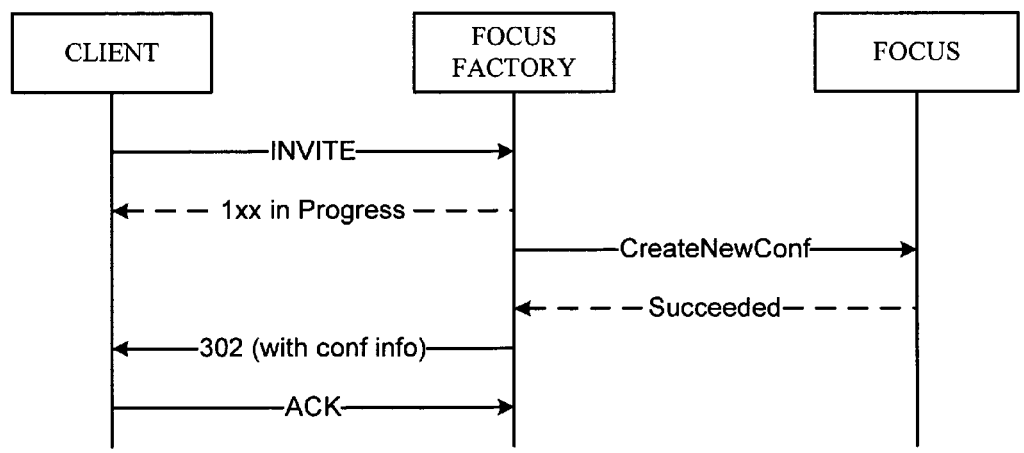
FIG. 9 illustrates an exemplary call flow diagram for initiating creation of a conference via a SIP Invite mechanism.

FIG. 9 illustrates an exemplary call flow diagram for initiating creation of a conference via a SIP Invite mechanism. The client passes all the information that it needs regarding the conference, media types, privileges, participants as part of an INVITE request to the focus factory. The focus factory creates the focus instance and redirects the client to the focus using the generated focus URI.

More specifically, the client sends an INVITE request to the focus factory with information to create the conference. The focus factory sends a provisional 1xx response to the client so that the client transaction does not timeout while the focus factory instantiates the focus. If it turns out that the time taken to create the focus is less than the SIP transaction timeout, sending this response can be ignored. The focus factory then parses out all the required information from the INVITE and creates a focus instance. In that the focus factory and focus can be collocated, this call to create the focus can simply be local function call. The focus factory then sends a 302 response with a contact header redirecting the client to start a new invite session with the focus. The client sends back an ACK to the focus factory.

Figure 10:
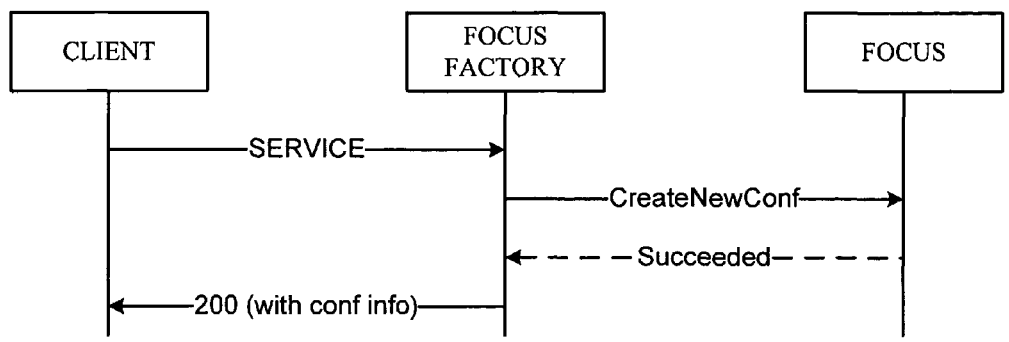
FIG. 10 illustrates an exemplary call flow diagram for initiating creation of a conference via a SIP Service mechanism.

FIG. 10 illustrates an exemplary call flow diagram for initiating creation of a conference via a SIP Service mechanism. The client passes all the information that it needs regarding the conference, media types, privileges, participants as part of a SERVICE request to the focus factory. The focus factory creates the focus instance and sends the connection information back to the client in the 200 OK response.

More specifically, the client sends a SERVICE request to the focus factory with information to create the conference. The focus factory parses out all the required information from the SERVICE and creates a focus instance. In that the focus factory and focus can be collocated, this call to create the focus can just be local function call. The focus factory sends a 200 OK response with the conference information.

Figure 11:
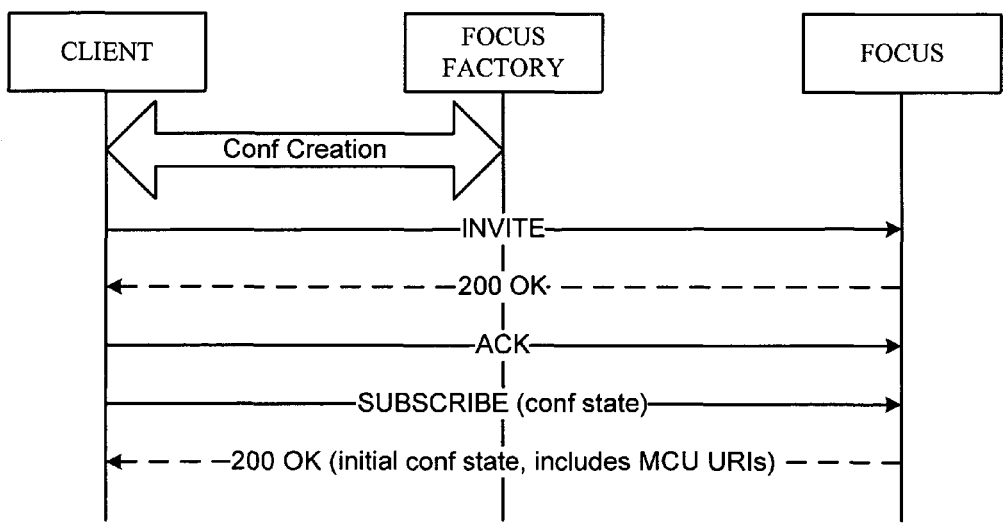
FIG. 11 illustrates an exemplary call flow diagram for a client dialing-in to a conference.

FIG. 11 illustrates an exemplary call flow diagram for a client dialing-in to a conference. The client establishes an INVITE dialog and a SUBSCRIBE dialog with the focus for dialing-in to conference. The client uses an INVITE dialog to join a conference and also uses it for further $3^{rd}$ party control of command traffic from the client to the focus. Control commands from the client are carried inside INFO messages. The body of the INFO message contains C3P control requests and is processed by the focus.

The client uses a SUBSCRIBE/NOTIFY dialog for watching the conference state. The focus accepts the subscription and notifies the subscribers of any conference state change. The state includes the state maintained by the focus itself, the conference policy, and the media information. For example, if a command that was sent by the client within the INVITE dialog using an INFO message is a command that changes conference state, the focus also informs the client by sending a NOTIFY of the altered conference state.

More specifically, the client sends an INVITE request to the focus URI to join the conference. This INVITE dialog has two purposes: it implies the client joining the conference and it is used for $3^{rd}$ party control of the conference using an INFO request in this dialog. A C3P addUser request in the body of the INVITE can be used to specify specific client attributes (e.g., display name, roles, hidden participant). The client sends a SUBSCRIBE to the conference event package to watch for conference state notifications. The initial conference state document can be piggybacked in the 200 OK of the SUBSCRIBE subject to the client expressing support for this extension.

Figure 12:
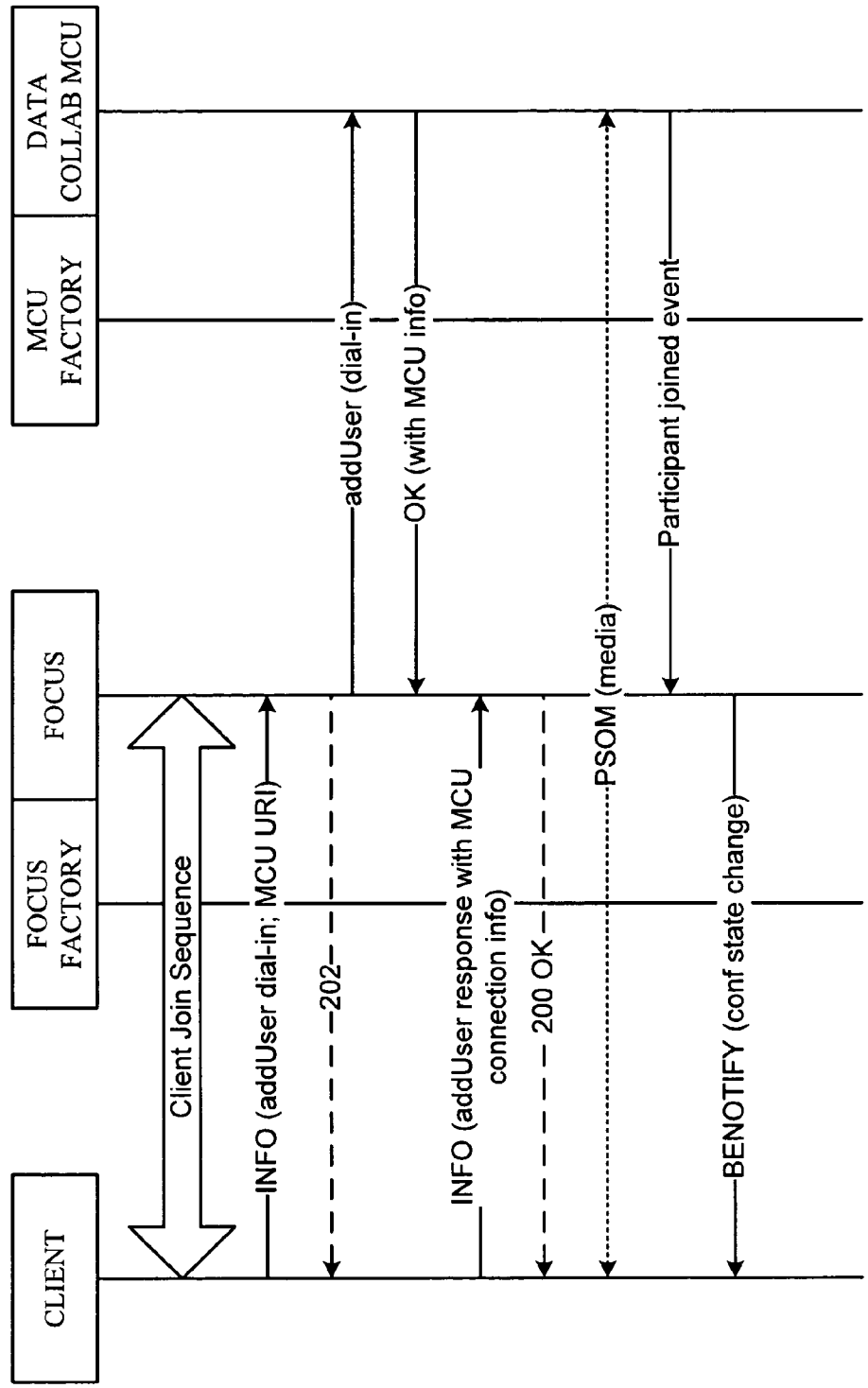

FIG. 12 illustrates an exemplary call flow diagram for a client joining via a data collaboration MCU by addUser dial-in. For each MCU in the conference, the focus assigns a virtual SIP URI which is routable to the focus itself. The initial notification from the focus to the client contains the URIs for all the MCUs in the conference. There are three ways in which clients can establish a media session with a MCU: addUser dial-in to the MCU URI, addUser dial-out using the MCU URI, and direct media INVITE to the MCU URI.

With respect to addUser dial-in, the client issues an addUser dial-in a C3P command, and the focus forwards the command to the MCU. The MCU authorizes the command and returns the appropriate connection information. The client then establishes a direction media session with the MCU. This could be primary mode of dial-in to a MCU which is not SIP-based.

More specifically, the client sends an INFO addUser dial-in command with the MCU URI it received in the notification document. The focus checks if a MCU has been assigned for this particular modality (media) for this conference. If a MCU has not been assigned, the focus sends an HTTP request to the MCU factory asking it to allocate an MCU for this conference. Assuming that the MCU has been allotted for the conference, the focus then sends an HTTP request to the allocated MCU asking it to expect a new participant (addUser). If it is the first time the focus has communicated with this MCU, other bootstrapping requests may have to be sent to initialize the conference on the MCU. The MCU responds back with a success message for the expected participant (addUser) call. The response will also have the actual URL to which it wants the participant to talk to the MCU. In the case of a data collaboration MCU, the URL could be a PSOM URL. Authorization information, if any, can be returned as well.

The focus sends the PSOM connection information to the client. The client then directly establishes a PSOM channel with the MCU. Once the client successfully joins the MCU, it sends a participant joined event to the focus. The focus then sends a participant joined MCU state change notification (via a SIPPING BENOTIFY (or Best Effort NOTIFY)) to all watchers of the conference.

Figure 13:
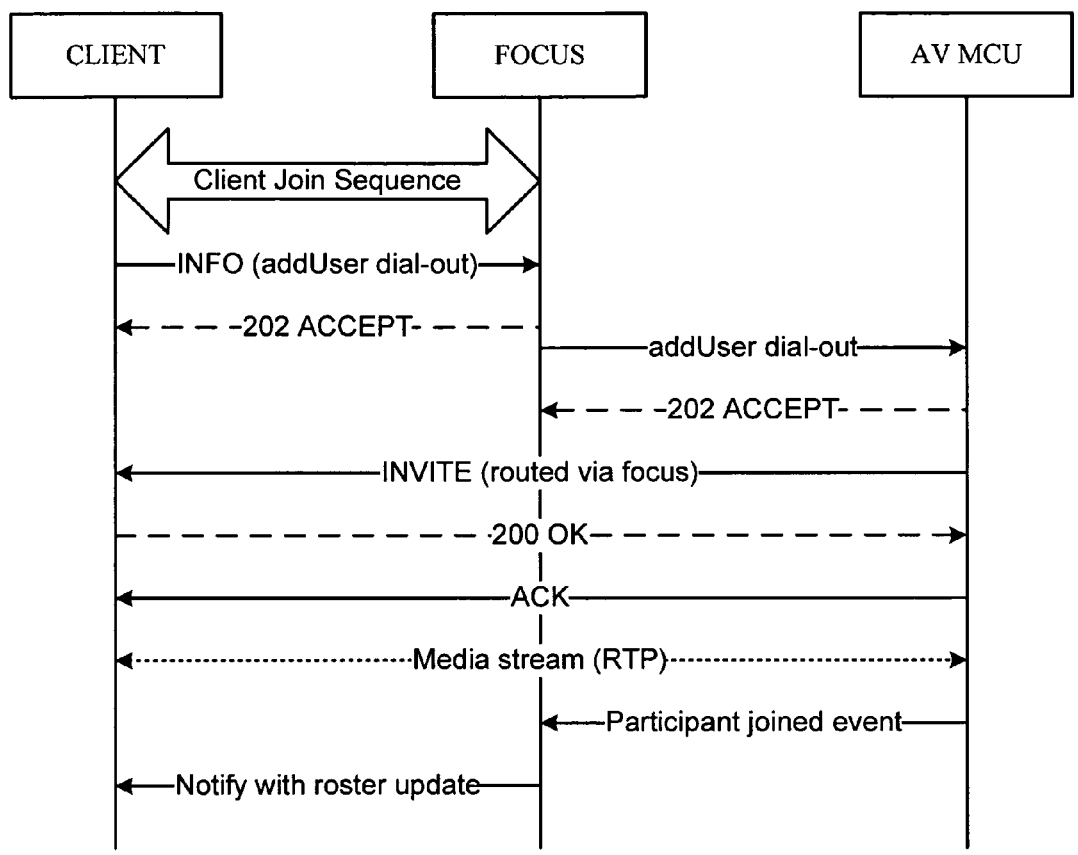
FIG. 13 illustrates an exemplary call flow diagram for a client joining via an audio/video MCU by addUser dial-out.

FIG. 13 illustrates an exemplary call flow diagram for a client joining via an audio/video MCU by addUser dial-out. The client issues an addUser dial-out C3P command and the focus forwards the command to the MCU. The MCU authorizes the commands and dials out to the client mentioned in the addUser command. The client then establishes a direct media session with the MCU. This is used in client connections to SIP based MCUs (e.g., A/V MCU and IM MCU). This mechanism can also be used for a client to dial out to another client via the MCU.

More specifically, the client sends an INFO addUser dial-out command with the MCU URI it received in the notification document. The focus then checks if an MCU has been assigned for this particular modality for this conference. If an MCU has not been assigned, the focus sends an HTTP request to the MCU factory asking it to allocate an MCU for this conference. Assuming that the MCU has been allocated for the conference, the focus then sends an HTTP request to the allocated MCU asking it to dial out to the user. The MCU dials out an INVITE to the client using an outbound SIP proxy which is usually the focus server itself. The client directly establishes an RTP media channel with the MCU. Once the client successfully joins the MCU, it sends a participant joined event to the focus. The focus then sends a participant joined MCU state change notification to all watchers of the conference.

Figure 14:
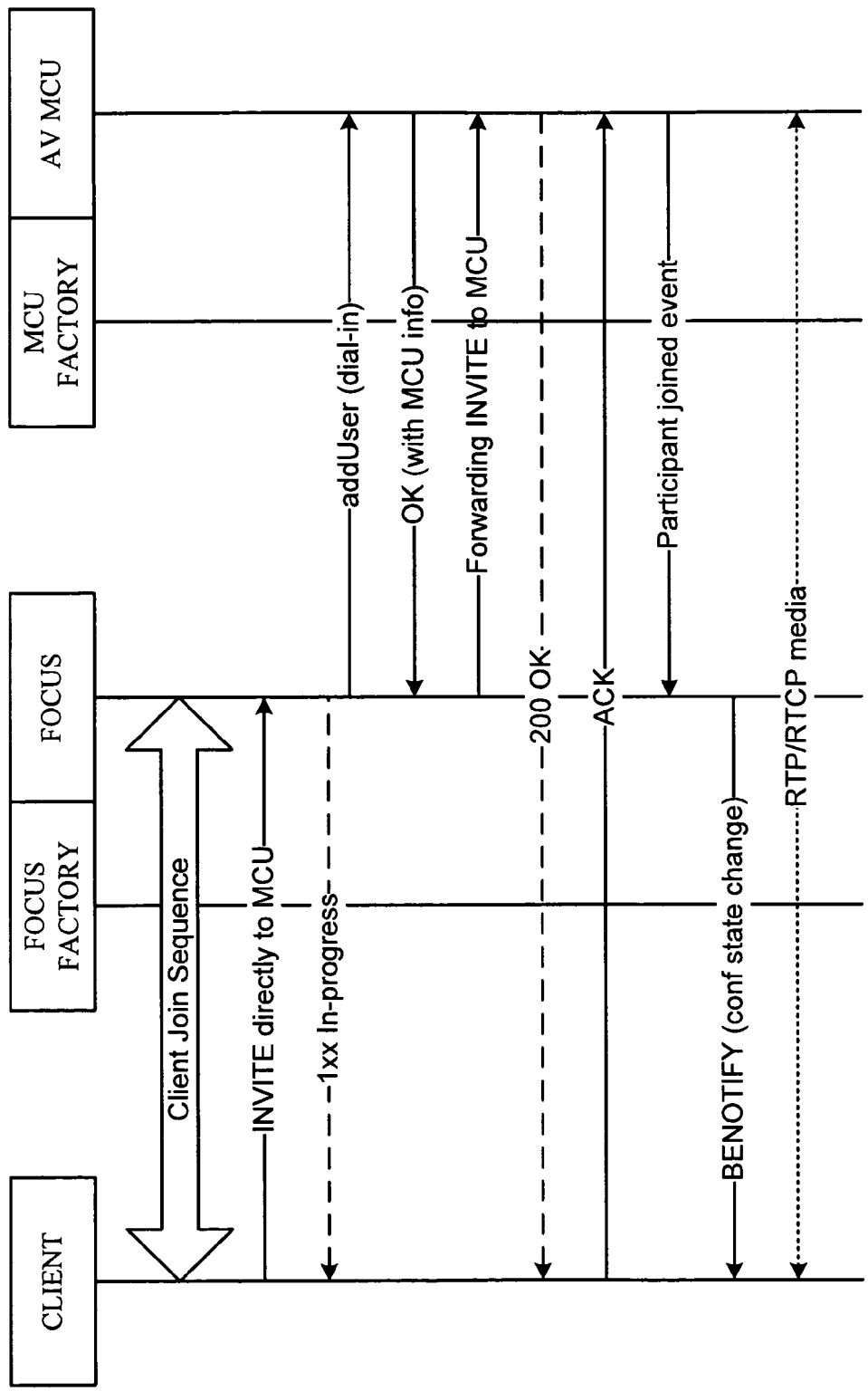
FIG. 14 illustrates an exemplary call flow diagram for a client joining via a direct invite to an MCU.

FIG. 14 illustrates an exemplary call flow diagram for a client joining via a direct invite to an MCU. Direct media INVITE to the MCU works with an MCU which uses SIP to establish sessions (e.g., A/V MCU, IM MCU). The client can send the media session invite to the MCU URI directly without any prior addUser call. The INVITE gets routed to the focus and the focus initiates the addUser to the MCU on the client's behalf. The MCU authorizes and responds with the connection information. The focus checks if the connection information is a routable SIP address and forwards the INVITE directly to the MCU. This is primarily to support a non-C3P pure SIP client to dial-in to a conference. A C3P client can fetch the MCU URIs from the conference notification and send a REFER message to a pure SIP client which can try to dial-in to the MCU directly.

More specifically, the client sends an INVITE to the MCU URI it received in the notification document. This INVITE gets routed to the focus. The client can add session description for the media negotiation. In that the focus knows that the INVITE is being addressed to a particular MCU, it safely ignores any session description in the body of the INVITE. The focus then sends an HTTP request to the allocated MCU asking it to expect a new participant (an addUser dial-in). If this is the first time the focus has communicated with this MCU it can send other bootstrapping requests to initialize the conference on the MCU. The MCU responds back with a success for the expected participant call. The response will also have the actual URL to which it wants the participant to communicate to the MCU.

In the case of A/V MCU, the URL indicates that the participant can communicate to the MCU via SIP. In the case of an A/V MCU, the focus forwards the INVITE to the MCU. The client sends back an ACK to complete the INVITE dialog is also used for media negotiation with the MCU. Note that although the client establishes the INVITE dialog directly with the MCU the SIP requests itself to traverse through the focus. Once the client successfully joins the MCU it sends a participant joined event to the focus. The focus sends a participant joined MCU state change notification to all watchers of the conference. Direct media negotiation between the client and the MCU is obtained. In the case of audio/video this can be RTP/RTCP streams.

Figure 15:
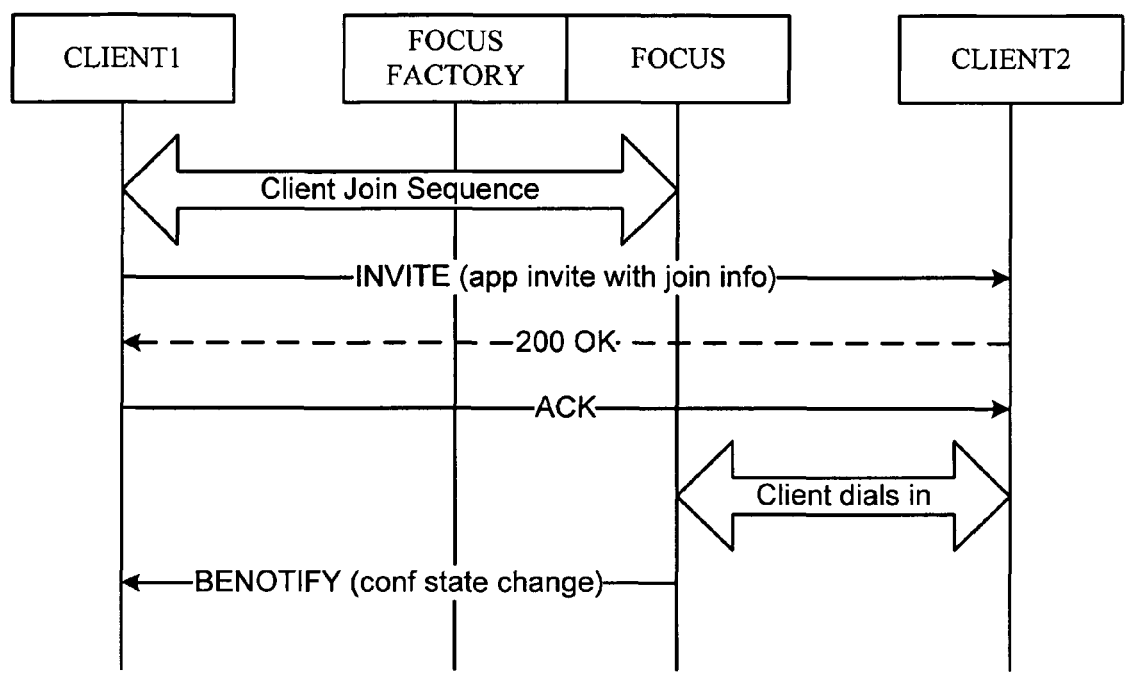

FIG. 15 illustrates an exemplary call flow diagram for an ad hoc invitation to another client participant resulting in a dial-in. The client will then send an app INVITE to the participant. The app invite with conferencing URL embedded with authorization PIN will show up as a message prompt in the user's client. Once the participant accepts/clicks on the message prompt it will launch the conferencing client which will dial-in the participant to the conference.

More specifically, the client sends an app invite to the participant which includes all the necessary information for the participant to dial-in to the conference, including authorization information, if any. The app invite will show up as a prompt in the console. Once the participant accepts the prompt, the conferencing client will launch enabling the client to dial-in to the conference. After the client successfully dials in to the conference, the focus sends a roster update notification to all watchers of the conference.

Figure 16:
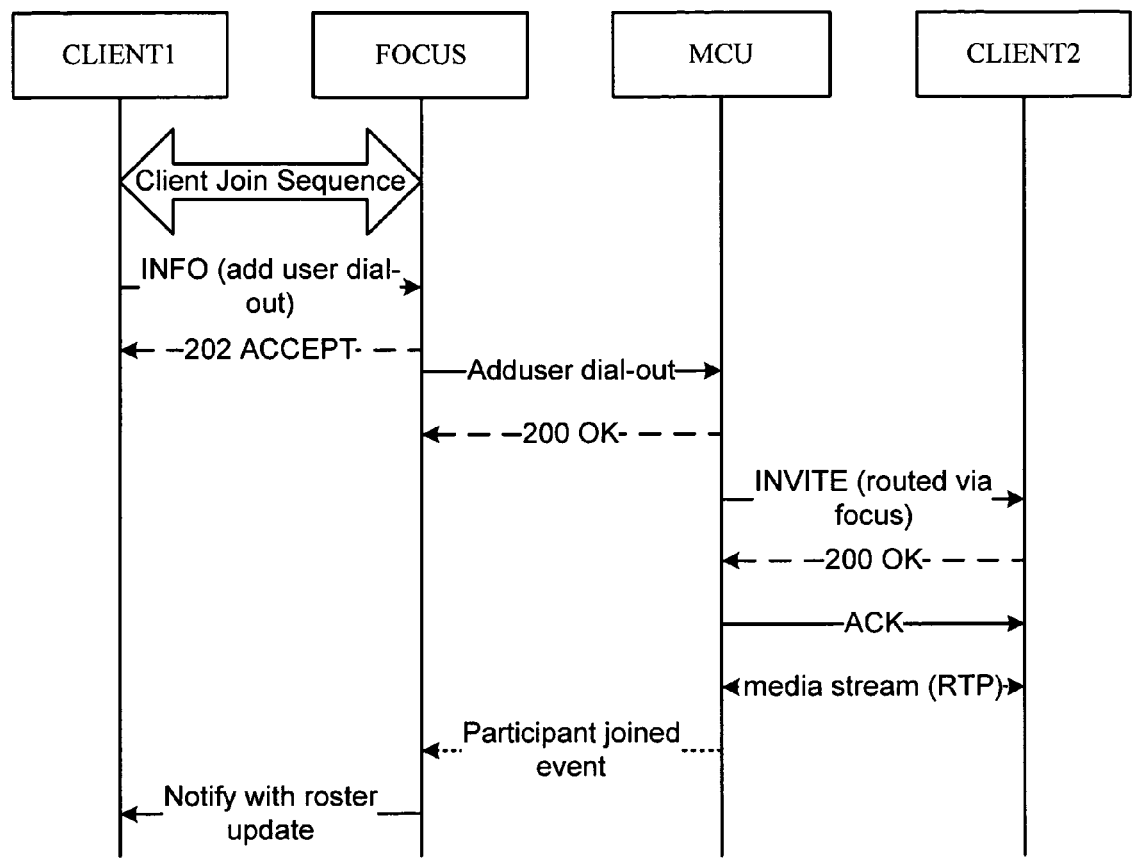
FIG. 16 illustrates an exemplary call flow diagram for an ad hoc dial-out INVITE to another client.

FIG. 16 illustrates an exemplary call flow diagram for an ad hoc dial-out INVITE to another client. A client join sequence is initiated between Client1 and the focus followed by an INFO addUser dial-out message from the Client1 to the focus. A 200 ACCEPT message is returned from the focus. The focus sends an addUser dial-out message to the MCU, and the MCU responds with a 200 OK. The MCU sends an INVITE message, which is routed via the focus, to a second Client2. Client2 responds with a 200 OK message, followed by an ACK from the MCU. A media stream (e.g., using RTP) is then initiated between the MCU and Client2. The MCU sends a participant joined event to the focus. The focus then sends an update roster message to Client1, indicating the Client2 has joined in the conference session.

The app invite mechanism mentioned above works with new clients which understand the application invite and the C3P protocol mechanism. However, legacy clients can be invited which do not understand C3P. This mechanism can also be used to pull pure SIP clients into a conference. The client can send a BYE to the initial INVITE dialog to leave the conference. For detecting crashed clients, session keep-alive messages can be used.

Conference state notification can occur from the MCU to the focus, and from the focus to the client. The state notification data model includes the following elements: a conference description (e.g., title, subject, organizer description); a conference view (e.g., conference level information for each entity focus such as AV MCU, IM MCU) that includes information about capabilities, current state, settings and policy; user (e.g., a roster of the conferences, the users, corresponding endpoints and the media sessions they are connected to); and sidebar, a representation of a sub-conference.

The following code represents one example of conference state hierarchy.

```
Conference-info [1..1]
    Conference-description [0..1]
    Conference-view [0..1]
        Entity-view [0..N] (keyed by entity URI)
            Entity-capabilities [0..1]
            Entity-policy [0..1]
            Entity-settings [0..1]
            Entity-state [0..1]
                Conference-media [0..N] (keyed by media label)
    Users [0..1]
    User [0..N] (keyed by user URI)
        Endpoint [0..N] (keyed by endpoint URI)
            Media [0..N] (keyed by media id. Label is a
                          reference to conference-media
                          element, see below.)
    Sidebars-by-val [0..1]
        Entry [0..N] (recursively defines a sub-conference object).
```

The following code represents one example of initial conference state with two MCUs (e.g., A/V, Data) and no users logged in.

```
<conference-info >
<conference-description>
    <display-text>brownbag </display-text>
    <conf-uris>
    <entry>
    <uri>sip:organizor@msft.com;ms-app=conf/meeting;ms-conf-id=cd</uri>
    <display-text>Data MCU</display-text>
    <purpose>meeting</purpose>
    </entry>
    <entry>
    <uri>sip:organizor@msft.com;ms-app=conf/audio-video;ms-conf-id=cd/uri>
    <display-text>AV MCU</display-text>
    <purpose>audio-video</purpose>
    </entry>
    </conf-uris>
```

-continued

```
</conference-description>
<conference-info >
```

The following represents one example of code for a user trying to join and bootstrapping the A/V MCU.

```
<conference-info >
<conference-description>
...
</conference-description>
<conference-view>
<entity-view entity="focus " / >
<entity-view entity="AV" >
    <entity-state />
    <entity-view />
<entity-view>
<conference-view>
</conference-info >
```

The following represents one example of code for a user Bob who joins the focus.

```
<conference-info >
<conference-description>
...
</conference-description>
<conference-view>
....
</conference-view>
<users >
<user entity="sip:bob state="full" >
<display-text>bob<display-text>
<roles><entry>presenter</entry></roles>
<endpoint entity="sip:bob;focus" >
    <status>connected</status>
</endpoint>
</user>
</users>
<conference-info >
```

The following represents one example of code for a user Bob who joins the AV MCU.

```
<conference-info >
<conference-description>
...
</conference-description>
<conference-view>
....
</conference-view>
<users >
<user entity="sip:bob state="full" >
<display-text>bob<display-text>
<roles><entry>presenter</entry></roles>
<endpoint entity="sip:bob;focus" >
    <status>connected</status>
</endpoint>
<endpoint entity="sip:bob;AV" >
    <status>connected</status>
</endpoint>
</user>
</users>
<conference-info >
```

Discovery of a focus factory URI can be done in several ways: by group policy usage, by DNS (domain name server), a fixed URI and user profile data of the server.

A method that is used commonly by administrators to distribute settings to clients is using Group Policy Objects (GPO). Certain application settings and features can be turned on or off through GPO settings. For instance, an administrator may choose to remove certain menu options or add some others through GPO. Through use of GPO, a domain administrator can point certain sets of users to certain focus factories. This removes the manual configuration requirement.

Another option is to use a DNS record to point clients to a focus factory URI. DNS SRV is an extension to the standard DNS server, and is used to get one or more IP addresses of servers, each having its own priorities. Below is an example SRV record:

_http._tcp.example.com. SRV 10 5 80. www.example.com

The SRV record naming convention requires that the record contain the following, in order: an underscore followed by the name of the service, a period, an underscore followed by the protocol, a period, and then the domain name.

Another option is to use a fixed URI for the focus factory, such as:

sip:FocusFactory@microsoft.com

This approach removes the guessing and discovery requirement altogether. An application running on frontend machines of a pool would interpret this to be a special URI and handle it that way. This means that the same URI is represented by applications running in multiple pools.

Another approach is by user profile data. Users sign-on to get roaming contacts and security information. Clients can subscribe to various types of data, including roaming contacts, roaming ACLs (access control lists), pending subscription requests on the user's presence data, and so on. This information is stored in the presence store. Data is carried to the client no matter whether the client is inside or outside of the intranet. When the client registers with its presence information it subscribes to these data types and the server sends them using the SIP protocol (using NOTIFY messages).

By introducing another data type, FocusFactoryURI, then the client can also subscribe for that data and receive it as a part of the original handshake. The added advantage is that when this information changes, the client is notified using SIP semantics, since the client subscribed to the FocusFactoryURI data type.

There are two options regarding how this data can be stored. Firstly, each user can have a separate FocusFactoryURI. Under this approach, the presence store can be extended and stores a URI for each and every user enabled for conferencing. Under the second approach, the focus factory URI is a pool level setting that all users homed on that pool share. A benefit of this approach is that it does not require the factory URI to be managed for each user, but rather stores a single URI for the whole pool. Since pool settings are shared among all frontend servers in that pool, the user services modules running on each frontend have access to this setting. The setting is visible to other pools in the system.

Focus factory and focus instances can be hosted on pools that are not homing users. This creates a routing requirement on requests coming from clients to the pool(s) hosting focus factory and focus instances. Even if the first requirement is not there, requests are routed from clients connected to different pools to the pool that hosts the focus instance.

User services can query the database for various types of data that is asked by the client, formats it into XML format and responds with NOTIFY messages. For this particular data type, instead of going to the database to retrieve it, the frontend machine receiving the request can refer to the pool level setting and prepare an XML document to send with a NOTIFY. If the setting is updated, the user services is notified of its change in a time window (e.g., 5-minute), allowing it to update its local value for the setting.

For pools that are homing users from multiple domains, the setting is configurable for each of the domains that are homed to allow different factory URIs for different domains homed. An example: of this is a hosting solution, where users are spread over many possible domains. The capability is provided to store multiple domain names per pool and assign focus factory URIs to them. The setting is visible to all pools.

The client application communicates with the focus factory to start a new conference. As explained above, since the client application acquires the focus factory URI when the user signs on, it has the means to communicate with the focus factory any time to start a new ad-hoc conference. When a SIP client wants to communicate with another, the SIP dialogs among clients start with an INVITE sent by one party to another. An SDP (session description protocol) package is carried through for media negotiation as payload within the INVITE and the 200 OK response for that same INVITE.

In the disclosed framework, to create a conference means creating and configuring a focus instance. The focus factory job is to return a URI to a focus back to the client. This means that the conversation between the client and the focus factory does not have to be long lived. It only needs to last until the focus URI is returned to the client.

The focus factory creates and configures a focus before it returns its URI back to the client. The configuration sets the types of media to be used by this conference, anticipated participant count, roles and privileges of known participants, role definitions, etc.

The focus factory has a web service interface allowing scheduling of meetings ahead of time. In that scenario, the conferencing client talks directly to the focus, never establishing a dialog with the focus factory. However, for ad-hoc conferences, the conferencing client talks to the focus factory to have it provide the focus URI.

Figure 17:
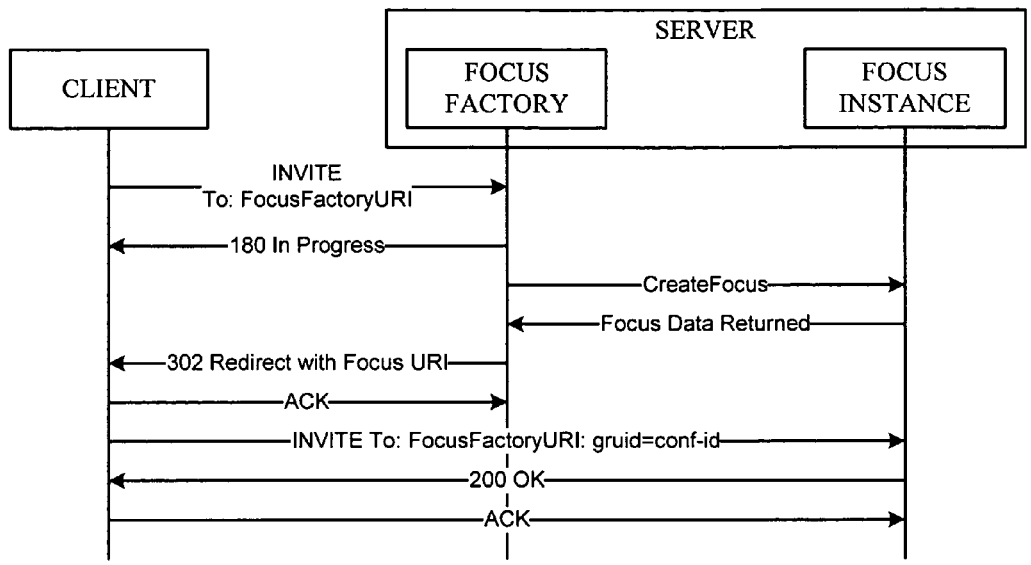
FIG. 17 illustrates an exemplary call flow diagram using redirection.

FIG. 17 illustrates an exemplary call flow diagram using redirection. Initially, the client sends an INVITE to the focus factory URI, where:

To=Focus Factory URI

From=User URI

Content-Type=Multi-part MIME

Content=XML content that contains the initial participant list, role mappings and a template identification token The focus factory application running on the pool receives the message and returns a 100—In Progress or 180—Ringing provisional response. This allows the client to wait while any data preparation and lookup is performed by the focus factory. The focus factory creates a focus and returns the focus URI in the contact header of a 302—redirect response. This allows the client to cache the contact header value as the conference URI. The client sends the same INVITE to the focus URI it has received. The only difference is that the To: header has the GRUID parameter that is the conference ID at this time.

Figure 18:
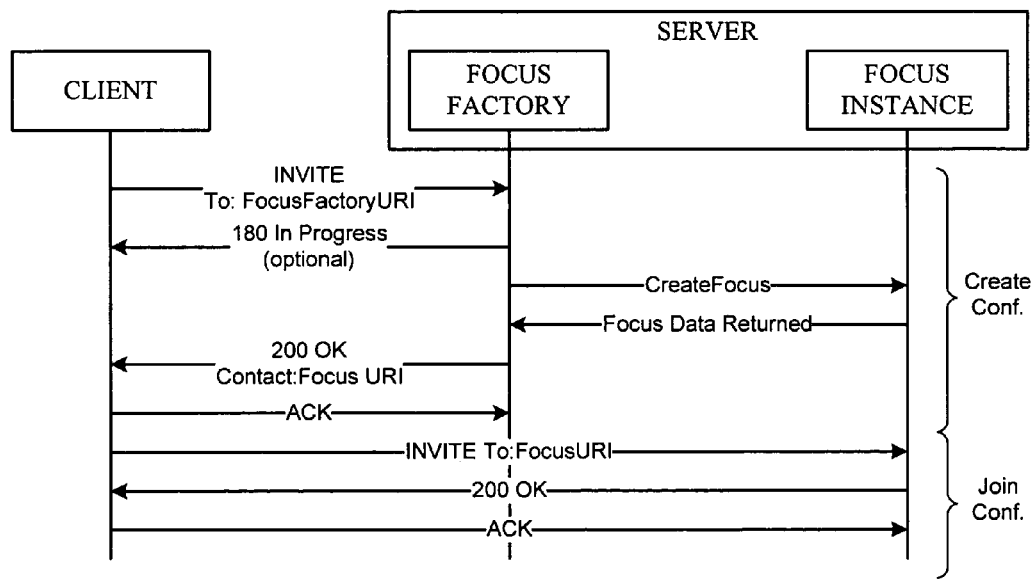
FIG. 18 illustrates an exemplary call flow diagram that treats the creation of the conference separate from the joining of the client to the conference.

FIG. 18 illustrates an exemplary call flow diagram that treats the creation of the conference separate from the joining of the client to the conference. This better reflects the stages of operation that occur. Thus, creation of the conference includes passing an INVITE from the client to the focus factory, optionally receiving a 180 In progress response back, sending a CreatFocus from the focus factory to the focus to create a focus instance, returning the focus data to the focus factory, sending the contact focus URI to the client, and acknowledging receipt. Messages associated with joining in a conference include sending an INVITE with focus URI for the client to the focus, receiving a 200 OK back to the client, and acknowledging receipt.

Upon receiving the INVITE message from the client, the focus factory creates a focus and returns focus information to the client. The focus, just like the focus factory, is a SIP endpoint represented by an application. The focus factory redirects the INVITE request that it receives to the focus, allowing it to become the endpoint that does the media negotiation with the client.

As indicated above, the focus is the "registered" handler for a conference. A focus URI represents the conference and is also referred to as the conference URI. One deterministic method is to use a fixed pattern for the user section of the URI and annotate it with the conference ID information. This allows routing logic to be written in an easier way based on the URI and allows the focus URIs to be mapped to a single application within the enterprise, which eases management of the system. This usage is outlined by "GRUU/GRID Extension" to SIP which allows appending a GRUU parameter to a well known Focus URI. Examples are:

Sip:conf-mgr@confserver.company.com;
   grid=Schumacher1980
Sip:FocusFactoryMS@conferencing.microsoft.com;
   grid=conf34242834

Focus factory behavior is that a focus lives on the same pool that the focus factory is running on. This can be a configurable setting for scaling conferencing focus instances completely separately from the SIP registrar server(s).

A focus instance runs on all frontend machines of a pool at the same time. This allows clients to connect to any frontend in the pool allowing distribution of load and better scaling. The focus state that is to be shared among focus instances for a conference is kept in a database. This data contains the roster, roles and privileges, media types and MCU identities, etc. Each focus instance handles connection state for clients that are connected to the particular frontend the focus instance is running on. Since each focus instance is a SIP endpoint, these connections are SIP dialogs.

When a focus URI is handed to a client, a part of that URI is the conference ID, a number that is generated by the database engine referring to a conference record in the database. The database record contains data indicating how long the record should be kept in the database as well as other information about the conference.

After handing the focus URI to the client, the focus factory does not have to hold on to any state or do any work. When the client sends an INVITE to the focus URI through the home server to which it is connected, the INVITE is routed to the pool that will host the conference. Upon receiving the INVITE, one of the frontend machines in the pool creates a focus and responds to the client.

As indicated above, a focus instance runs on all frontend machines of a pool. Issues for consideration include routing, performance, stability, and reliability. As described supra, state that is associated with a conference is stored in a database that is accessible by all frontend machines of a pool. This allows the state related to the conference to be shared among multiple instances of focus applications running on different frontend machines in the pool. As a result, each client connects to their pool and/or home server and the focus they are trying to reach is running on that box, ready to answer all conference related requests they may send.

Figure 19:
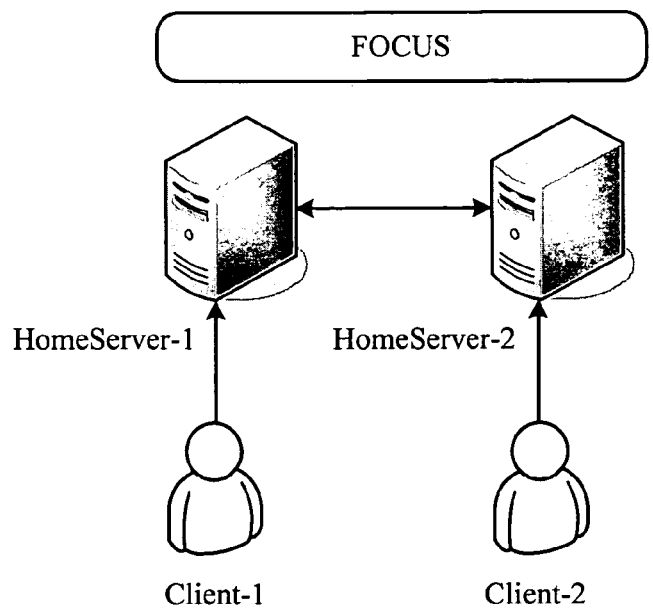
FIG. 19 illustrates a server pool system that shares state among multiple instances of focus applications running on different frontend machines in the pool.

FIG. 19 illustrates a server pool system 1900 that shares state among multiple instances of focus applications running on different frontend machines in the pool. The system 1900 addresses the issues routing, performance, stability, and reliability by distributing load to across all frontend machines (or frontends), removing routing requirements, and using high availability features. Connection management load is randomly distributed among all frontend machines of the pool. Additional frontend machines can be added and removed easily, since they have no identity other than being associated with a pool. With respect to stability, in case a frontend fails, all users connected to that frontend can try and reconnect to the conference. All these users will be load balanced again and connected to other frontends in the same pool. Routing issues are removed, since none is needed. Shared state for the conference is stored in the database and all frontends can access it. No single machine needs to be the information broker.

Figure 20:
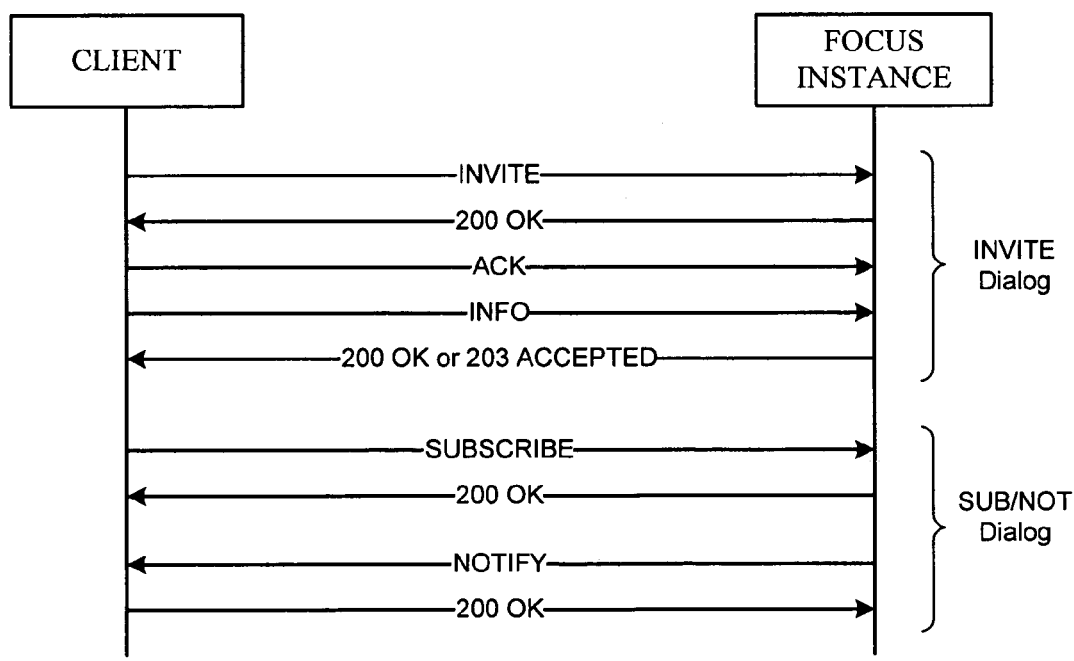
FIG. 20 illustrates an exemplary call flow diagram of two separate client-focus dialogs with a focus instance.

FIG. 20 illustrates an exemplary call flow diagram of two separate client-focus dialogs with a focus instance. An INVITE dialog is the dialog that allows the client to join a conference and it is used for further command traffic from the client to the focus. Commands from the client are carried inside INFO messages. The body of the INFO message contains a SOAP-like XML body and is processed by the focus. Note that the single INFO message in FIG. 20 represents all INFO messages for the lifetime of the conference. Based on the role assigned to a client, a client can issue commands for conference control, conference policy control, media control or media policy control.

Once a client is joined into a conference, it should be informed of events that are happening in the conference such as participants joining and being removed, media being added or removed, etc. These changes to the conference state as well as changes to policies for conference and media are carried through NOTIFY messages sent to the client within this dialog. If a command that was sent by the client within the INVITE dialog using an INFO message is a command that changes conference state, the focus informs the client by sending a NOTIFY containing the altered section of the conference state. Note that the single NOTIFY message in FIG. 20 represents all NOTIFY messages for the lifetime of the conference.

An option for starting a type of media in a conference is to have the focus created and all MCUs informed of the conference when the focus is created. This allows later enabling of media to be quick. Additionally, since the media is enabled upfront, MCUs would know about the part of the roster that can contact them up-front, allowing the user join operations for media to be performed with no delay. In this model, as soon as the focus is created, it sends commands to MCUs allocating meeting state and passing on the conference roster for expected participants. The focus then updates the conference state with MCU information for used media types. This way, whenever a participant comes in and joins a media, the focus does not have to go to the MCU to get connection information. The experience will be one and the same for the first and last participant joining the meeting.

As indicated above, the MCU factory is a logical entity that provides access information for an MCU. The MCU factory can be a vendor specific implementation for vendors of MCU devices or software. The focus knows through settings what MCU factories are present in the system and what media types they support. The focus asks the MCU factory for information about how to contact an MCU, and the MCU factory returns that information based on whatever internal logic it may be running.

For example, consider a deployment where there are 1$^{st}$ and 3$^{rd}$ party MCUs present for A/V activity. This means that the MCU factory list would contain two entries, one for each of these vendors for this media type. Example representation of settings includes the following.

| Media Type | MCU Factory URL |
|---|---|
| A/V | http://MCUFactory.1stParty |
| A/V | http://MCUFactory.3rdParty |

When a conference with A/V activity is created, the focus that represents that conference contacts the MCU factory for the type of MCU that is going to be used in that conference. In a scenario such as this one where there are multiple MCU factories present, the focus picks one of the MCU factories. The use of templates resolves this.

C3P is the conference control/manipulation control protocol used to modify the conference state. In the disclosed architecture, the C3P command flows from the client to the focus and from the focus to the MCU, the reverse direction applies for conference notification. C3P has a request/pending response/final response semantics similar to SIP.

Figure 21:
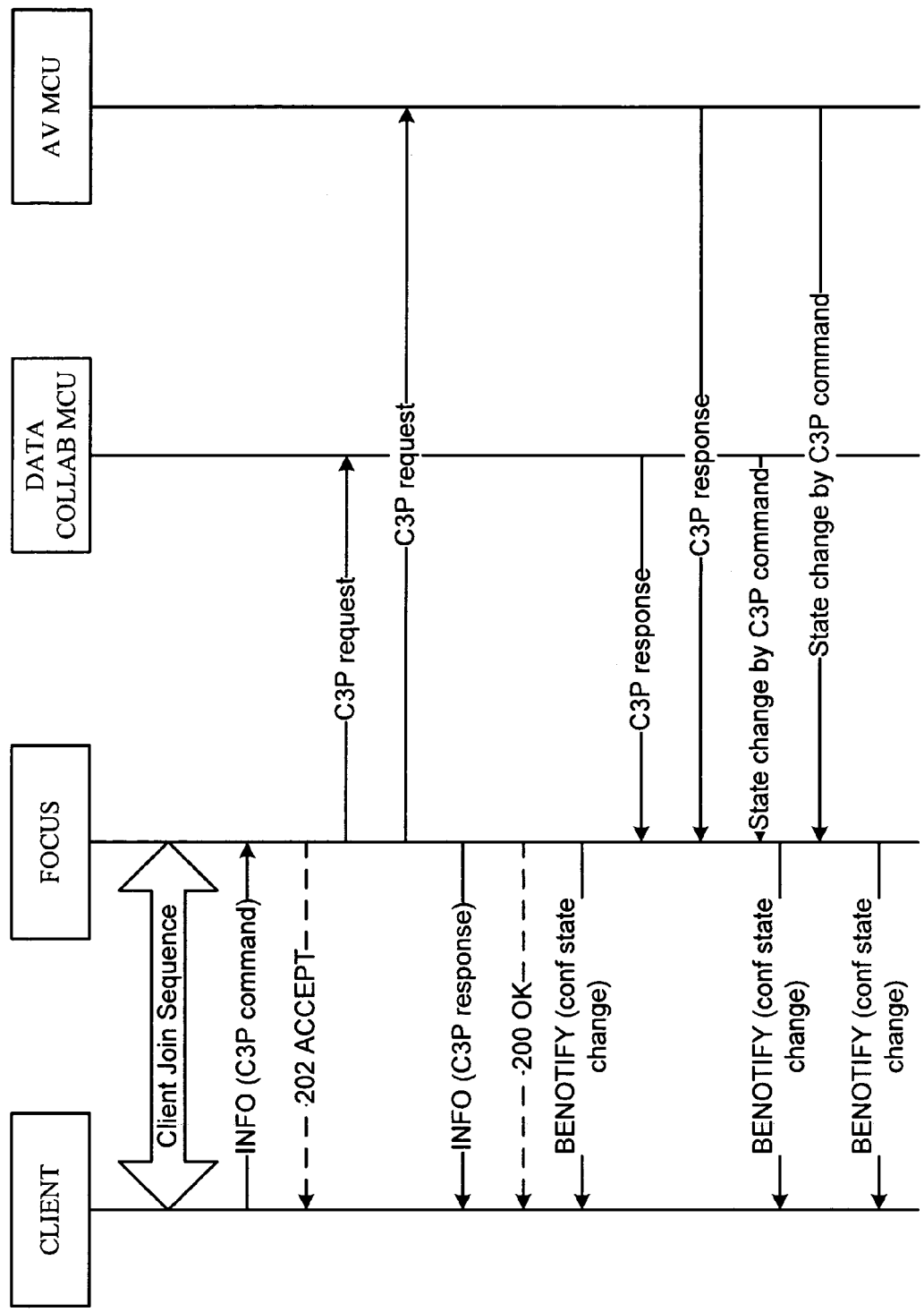
FIG. 21 illustrates an exemplary call flow diagram where a client issues a C3P command for modifying conference state.

FIG. 21 illustrates an exemplary call flow diagram where a client issues a C3P command for modifying conference state. The client initiates a join sequence to the focus. An INFO C3P command is send from the client to the focus. The focus responds with a 202 ACCEPT. The focus sends a C3P request to a data collaboration MCU, followed by the same type of request to an audio/video MCU. The focus also sends an INFO C3P response to the client followed by a 200 OK message. The focus then sends a state change notification (via a BENOTIFY) to the client. The MCUs (data collaboration and A/V) send C3P responses to the focus. The data collaboration MCU and the AV MCU each send a state change notification by C3P command to the focus. The focus then sends corresponding state change notifications (via a BENOTIFY) to the client.

Figure 22:
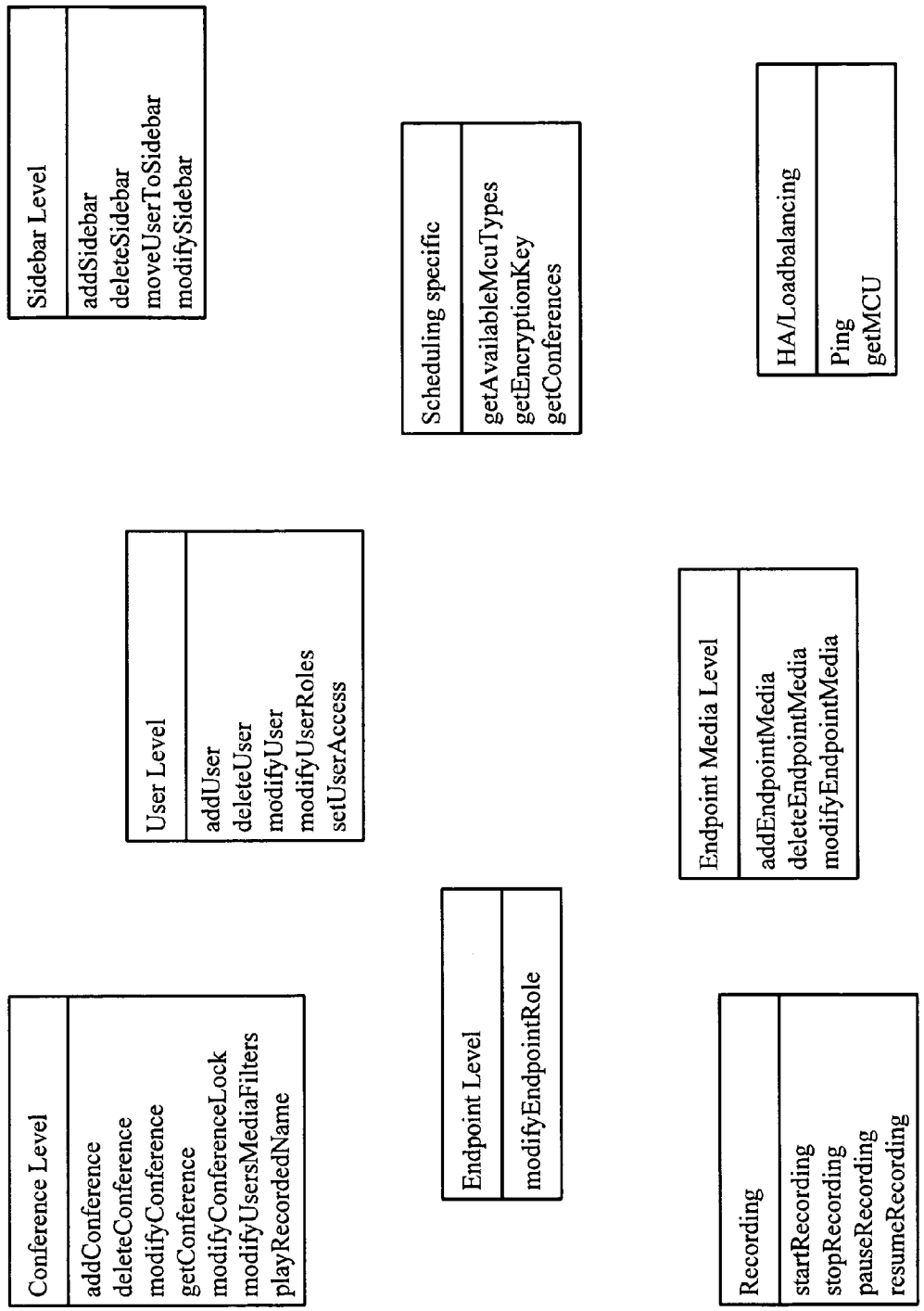
FIG. 22 illustrates C3P commands that can be utilized in accordance with the distributed MCU conferencing architecture.

FIG. 22 illustrates C3P commands that can be utilized in accordance with the distributed MCU conferencing architecture. The commands are related to a conference level, user level, sidebar level, endpoint level, endpoint media level, recording, load balancing, and scheduling specific. At the conference level, a conference can be added, deleted, modified, a lock modified, media filters modified, a recorded name played, and a get of a conference. At the user level, a user can be added, deleted, and modified, user roles modified, and user access set. At the endpoint level, the endpoint role can be modified. At the endpoint media level, a media endpoint can be added, deleted and modified. At the sidebar level, a sidebar can be added, deleted and modified. A user also can be moved to the sidebar. With respect to recording, a recording can be started, stopped, paused and resumed. With respect to scheduling, available MCU types, encryption key and conferences can be obtained (via a get). With respect to load balancing, the MCU can be obtained along with ping values.

The disclosed conferencing architecture can be installed in several configurations, starting with a simple, single server install for small and medium sized businesses and, departmental installations to hosted mega-service with multi-server installs and different number of servers for each of the conferencing functions with different scaling characteristics. The configuration requirements in turn drive the server architecture and how the functional pieces are separated.

In a single-server configuration, all the server components necessary for providing presence, instant messaging, multi-party web conferencing, audio-video conferencing, and recording can be installed on a single machine. In this mode, the "home server" for registration and presence, conference manager, conference foci, A/V MCU, and data MCU components, for example, will all run on the same server. This configuration supports a small number of users and concurrent meetings. For example, a single server install may support up to 500 concurrent users for presence assuming that no more than 100 users will be doing IM at any given instant and there will be no more than 50 concurrent multi-media conference participants (data/audio-video). Registration as well as the conference databases could also be running on a single server. TCP ports and URL namespaces will be shared resources.

Figure 23:
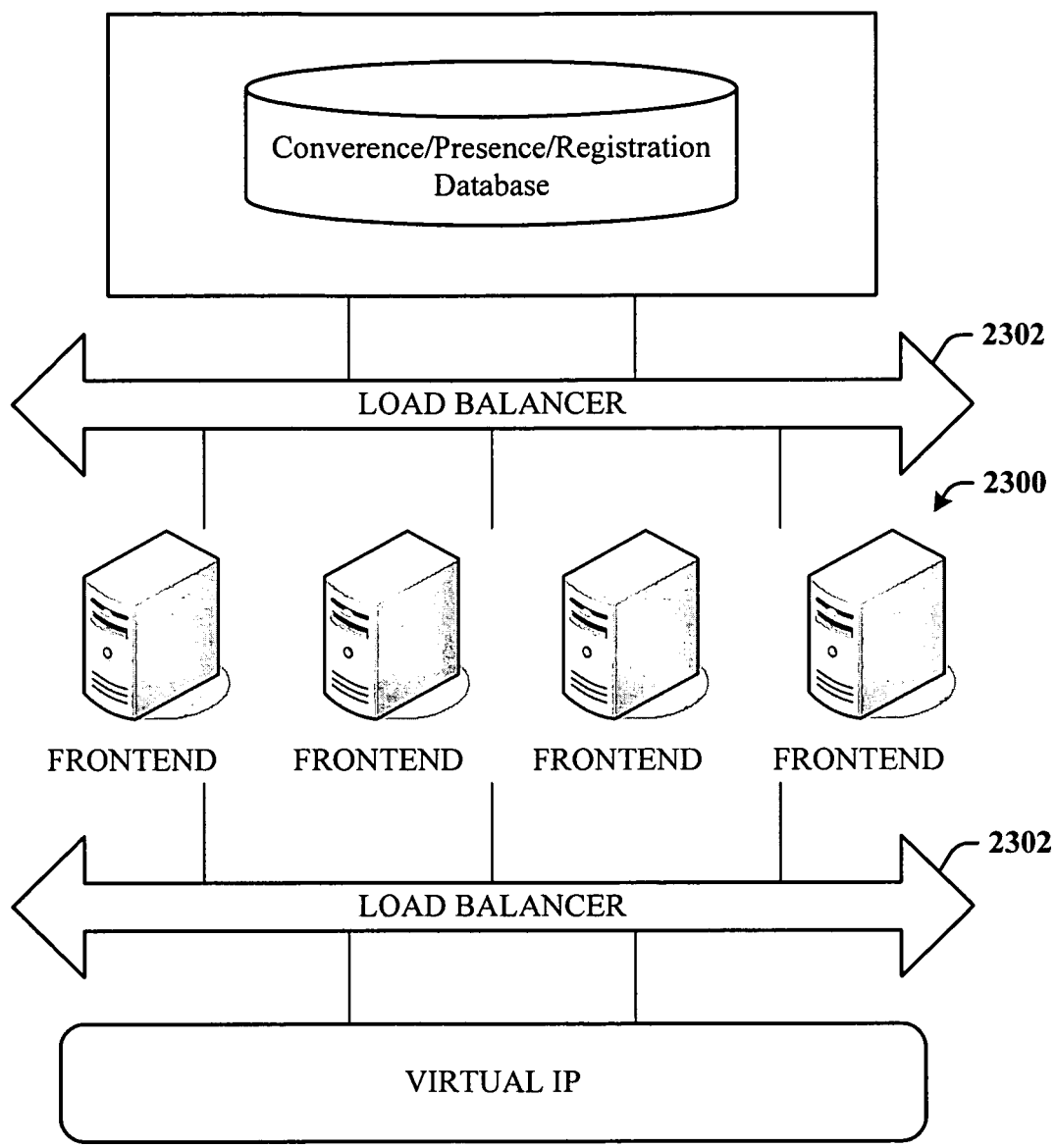
FIG. 23 illustrates a multi-server pool where frontend servers have equivalent functionality.

FIG. 23 illustrates a multi-server pool where frontend servers 2300 have equivalent functionality. In this model, multiple servers are implemented behind an IP load balancer 2302. Multiple servers provide a high availability solution wherein if one of the server frontend system fails, clients will detect the frontend failure and automatically reconnect to one of the other available frontend servers.

Each of these frontends 2300 not only includes registration, presence and routing functionality, but also conferencing functionality. Each frontend runs an instance of the focus factory, MCU factory, zero or more focus host processes, and media MCU processes. The failure detection and take-over logic can be extended to include conferencing sessions. If a conference fails in the middle, clients are able to connect back to the focus, which is re-instantiated on another frontend server once the failure is detected on the server pool 2300. The new focus re-instates as much state as it has from the previous incarnation of the focus and allows clients to continue from where they left off in the conference.

All servers 2300 are equivalent in functionality. Software components such as focus factory, foci, MCU factory, MCUs, web scheduling interfaces, etc., are installed on all the frontend servers. While focus and MCUs have different scaling characteristics, this configuration offers simplicity of setup and management while providing high availability and failure recovery. The architecture also allows for separating the MCUs onto separate boxes.

Figure 24:
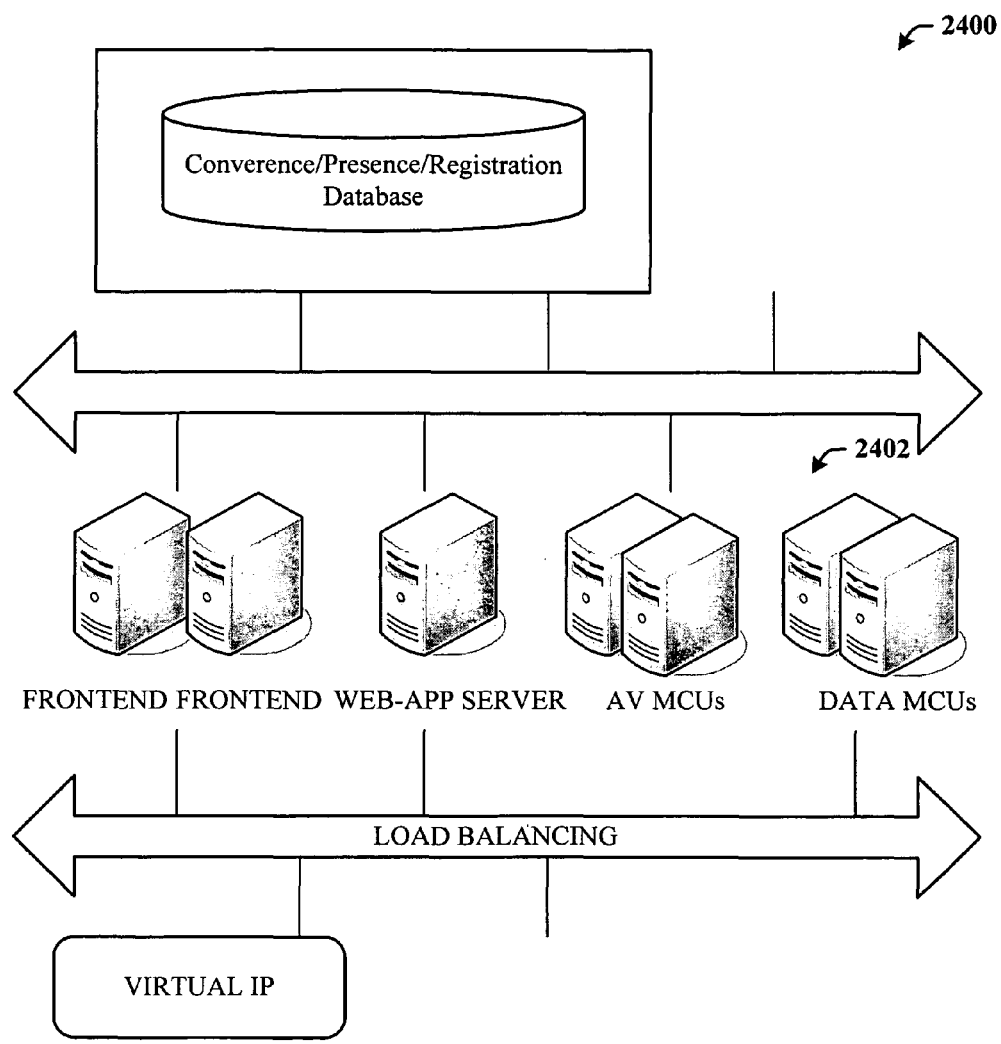
FIG. 24 illustrates a multi-server pool configuration for failure recovery and high availability characteristics.

FIG. 24 illustrates a multi-server pool 2400 configuration for failure recovery and high availability characteristics. In addition, it offers the ability to separate the functions with different scaling characteristics to different servers. Further, MCUs 2402 can be chained together for scaling conferences and to allow federation either between companies or between a company and hosted service. MCUs relay, mix and process media. The media transfer and processing is much more CPU and network intensive compared to the signaling and conference control data which passes through the focus. Accordingly, MCUs can be scaled independent of the presence, signaling and conference control elements.

Figure 25:
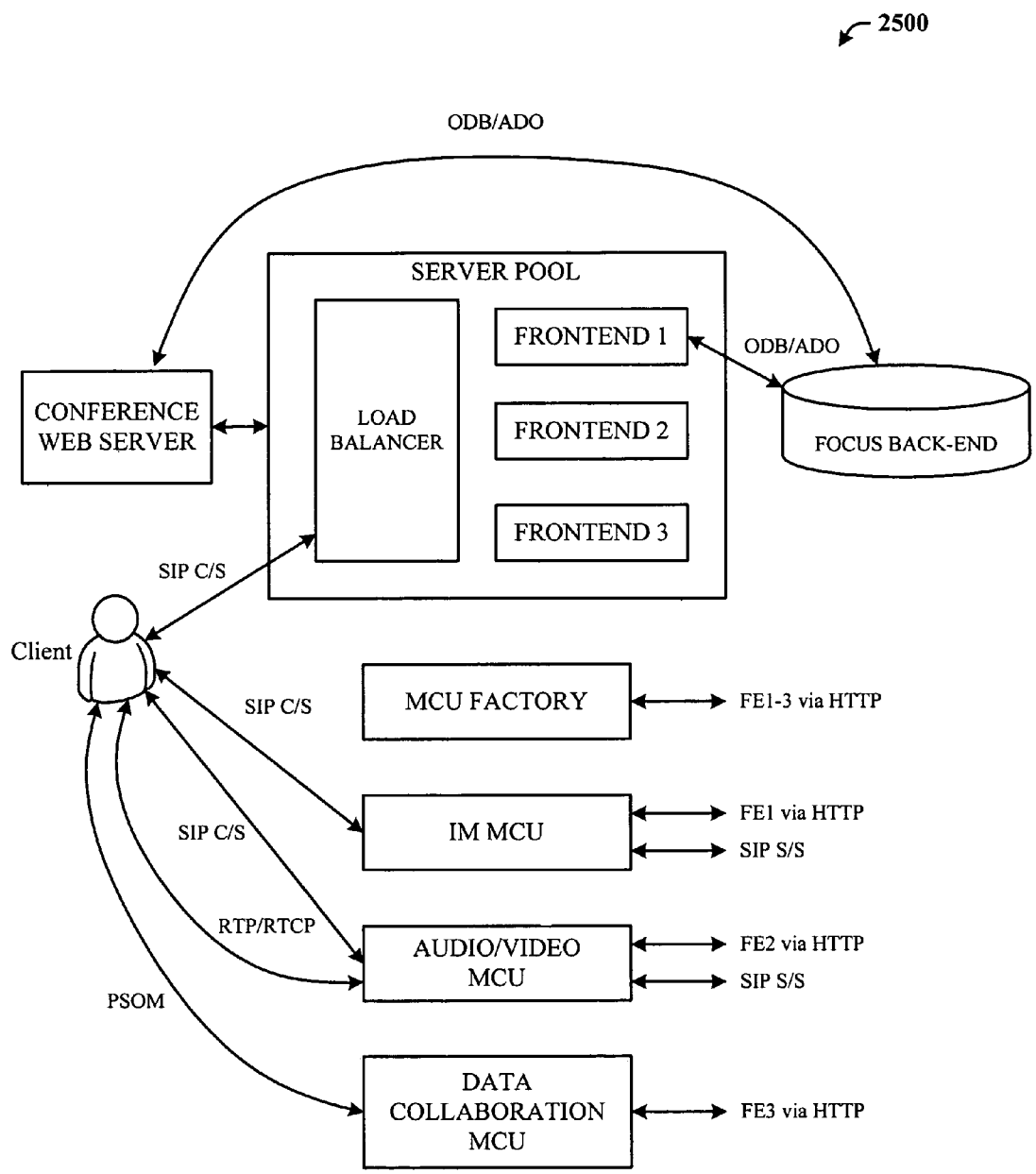
FIG. 25 illustrates a topology view of various types of data flow between entities of the distributed media component architecture.

FIG. 25 illustrates a topology view of various types of data flow between entities of the distributed media component architecture. Client-to-server (C/S) communications such as with the MCUs (e g., IM MCU, A/V MCU) and to the load balancer can be via SIP. The load balancer can interface to the frontend servers also using SIP. For audio/video streams, the client can interface using RTP/RTCP. For interacting with the data collaboration MCU, the client can use PSOM. Each of the MCUs can interface to the frontend servers using HTTP, which the MCU factory also uses. A conference web server can be accessed by a browser application. The web server can access a focus backend server (e.g., SQL server) using ODB (object data base)/ADO (ActiveX data objects), for example. A frontend server (e.g., Frontend 1) can also access the backend server using ODB/ADO. Server-to-server (S/S) communications (e.g., IM MCU to the server pool, A/V MCU to the server pool) can be using SIP. The load balancer can interface to one or more of the frontend servers using server-to-server SIP.

Figure 26:
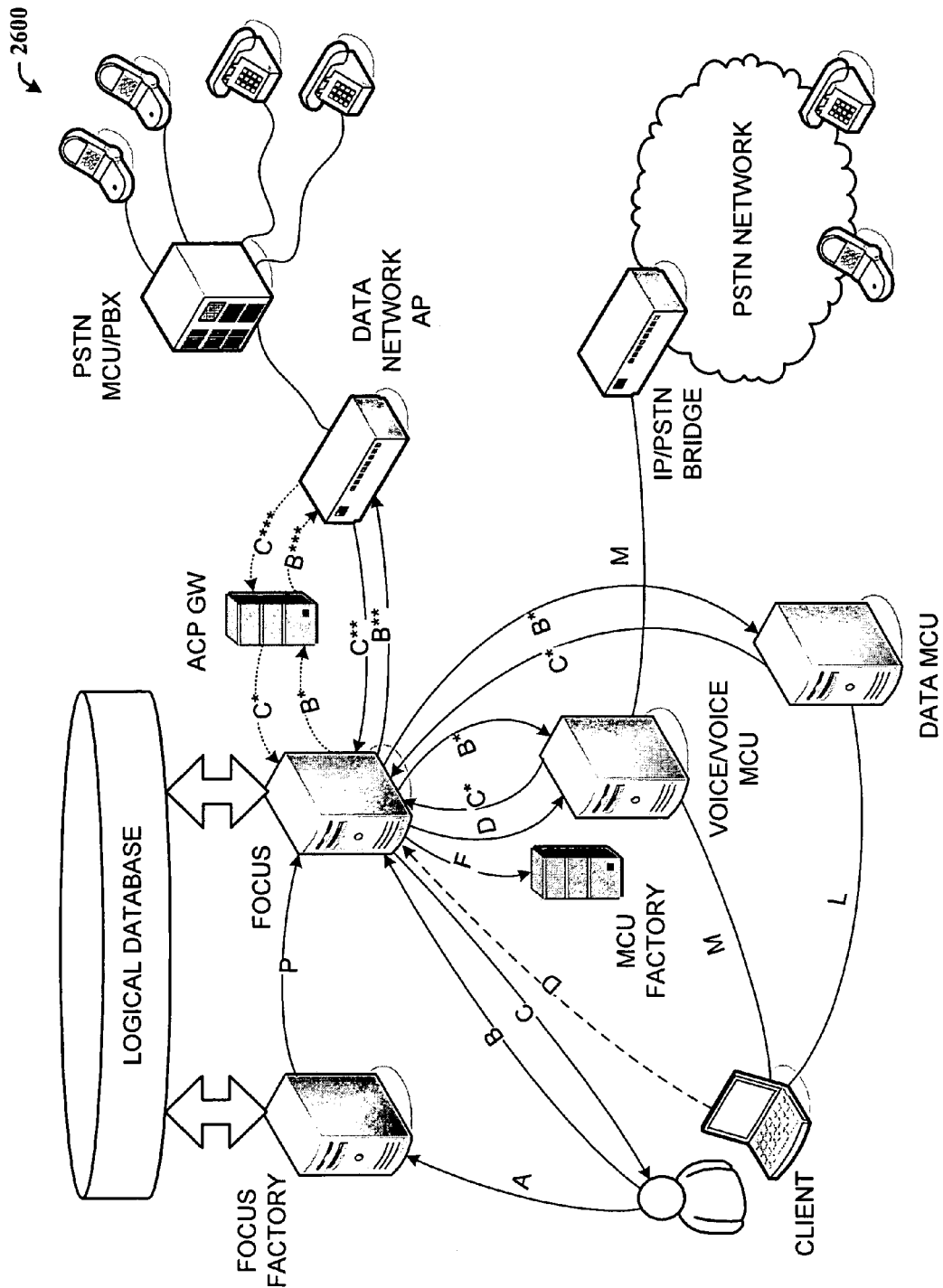
FIG. 26 illustrates an overall conferencing architecture using pluggable and distributed media components.

FIG. 26 illustrates an overall conferencing architecture 2600 using pluggable and distributed media components. The architecture 2600 also allows for shielding of multiple MCUs being used for the same media type, for example, implementing cascading between voice IP MCU and PSTN MCU for bridging IP and PSTN participants into the same conference. Once a conference and its conference URI is allocated (using interface A) and a client receives focus permission to access the conference (using interface B), the client subscribes to the conference event state information (over interface C) and retrieves the actual conference URI per media MCU from the document received in the first event from the focus (over interface C). The client uses the retrieved conference MCU URI to dial into (or join) the conference and perform the $1^{st}$ party basic SIP call signaling operations directly with the MCU (over interface D).

The SIP signaling (over interface D) will be automatically proxied through the focus by SIP routing means. A PSOM signaling and data protocol (over interface L) is routed directly between the client and the data MCU. The SIP connections, being proxied through the focus, have the opportunity being inspected and the local polices being enforced regarding authentication, authorization, membership, etc. Note that since in the case of the PSTN MCU and data MCU, the $1^{st}$ party call signaling is not being proxied through the focus. The policies for these MCUs can be explicitly uploaded from the focus to the MCU. The client uses the SIP dialog established with the original conference URI (over interface B) to perform any other type of conference control using CCCP, also referred to herein as C3P.

From the focus perspective, the ACP MCU is being treated as any other IP MCU with the exception that the transport is SIP instead of HTTP. This interface is illustrated shown in the picture as B and C where B is CCCP tunneling over SIP and C** is the conference package of XML events tunneled over SIP. In one implementation, an ACP GW (gateway) logical module is implemented to allow ACPs, already supporting the SIP-CX protocol to seamlessly integrate into the infrastructure.

Since the $1^{st}$ party signaling (e.g., PSTN signaling, in this case) is not visible to the focus, additional security handshake (addressing authorization) is implemented between the focus and the ACP MCU (and the ACP GW).

The data MCU does not need to implement SIP. Consequently, a client attempting to dial-in to the conference will result in the redirection to the HTTP URI pointing to the data MCU. Note that all the security issues (including authentication and authorization) can being dealt with directly between the data client and the data MCU using PSOM.

With respect to conference state and notifications, each MCU in the system maintains the state information for each of the conferences it hosts. This information represents the MCU's media-specific view of the conference. The MCUs push the changes in their conference's state to the main focus over interface C* conference package of XML events over HTTP. The main focus dynamically receives the individual state information from each of the MCUs (over interface C*), aggregates the information, and distributes the complete conference view to the clients (over interface C) subject to each client subscription and privileges. Each interested client and a potential participant can SUBSCRIBE to the conference of its interest (using the conference URI) with the main focus (over interface C).

In the first conference state notification to each subscriber, the focus includes all the information about the conference. If the mixing for the conference is performed by multiple media MCUs, the media conference URIs routing to each of the MCUs are listed as the conf-URIs of the conference. The client parses the XML conference state document and initiates the appropriate $1^{st}$ party signaling (e.g., INVITE over interface D or Data MCU over interface L) towards the MCU(s).

Using SIP means a participant is capable of joining and leaving a conference. Using SIP also means a participant can change its own media streams by sending re-INVITE to the MCU. This kind of operation is called "$1^{st}$ party signaling" and is shown as interface D. These operations do not affect the state of other participants in the conference.

Limited operations for controlling other conference participants (called "$3^{rd}$ party control") through the focus using SIP can also be obtained. In order to perform richer conference control a user client can implement a CCCP client. Using CCCP over interface B, a client can affect its own state, state of other participants, and the state of the focus/MCUs which may indirectly affect the state of the conference participants. Conference control using CCCP is logically performed on the conference state. Using CCCP requests, a client expresses how it would like to see the conference state to become. The CCCP server performs the operation and updates its "master" conference state to reflect the changes.

Look at an example, "put a specific media of a specific participant on-hold" request. In order for a client to request this operation, it first needs to learn about the particular participant with his/her active streams and then explicitly point to this participant and the specific stream using the CCCP. The focus provides sufficiently rich state information in its notifications so that the clients can issue explicit control commands for the conferencing system. The focus final response includes the status of the operation and may include the affected part of the conference state. Note that independent of the described CCCP transaction, the conference state change can be reported to the users subscribed to the conference state package, subject to their privileges.

The focus creates a new conference using the MCU factory. The focus includes a list of available MCU factories in the system or pool with the corresponding URI(s), the supported media type(s), and the control URI(s) for each. Each MCU factory represents a logical set of MCUs having a supported media type where new conferences can be allocated. In order to allocate a new conference, the focus chooses one compatible MCU factory from the table and issues the "getMcu" CCCP primitive request to its control URI (over interface F). The CCCP request to choose an MCU can contain the conference object describing the desired conference description and capabilities. A successful response includes the MCU control URI to which the CCCP requests are addressed. In the failure case, the focus will try another compatible MCU factory. Note that the MCU factory control URI and the MCU control URI may be the same or different URIs, subject to the MCU factory implementation. The described decomposition allows each MCU vendor implementing load balancing (or other kind of logic) for their MCU farm without affecting the architecture.

The control interface between the main focus and each of the MCUs (interface B*) is for issuing the requests from the focus, and can be implemented using CCCP. Over this interface, the focus acts as a CCCP client and the MCU acts as a CCCP server.

A brief summary of the interfaces is now provided. Interface A is the SIP interface for ad-hoc conference creation; interface B is for cc-conferencing ($1^{st}$ and limited $3^{rd}$ party) and CCCP over SIP; interface B* is for CCCP over HTTP; interface B is for CCCP tunneling over SIP; interface B* SIP-CX over SIP; interface C is for SUBSCRIBE/NOTIFY of a conference package over SIP; interface C* is for conference package XML events over HTTP; interface C is for conference package XML events tunneled over SIP; interface C* is for conference package XML events as in SIP-CX; interface D is for SIP-1$^{st}$ party only; interface F is for CCCP over HTTP for conference creation/allocation only; interface L is for a data protocol (data and 1$^{st}$ party signaling); interface M is for media (e.g., RTP/RTPC for voice and video); interface P is for communications between the focus factory and the focus.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 27:
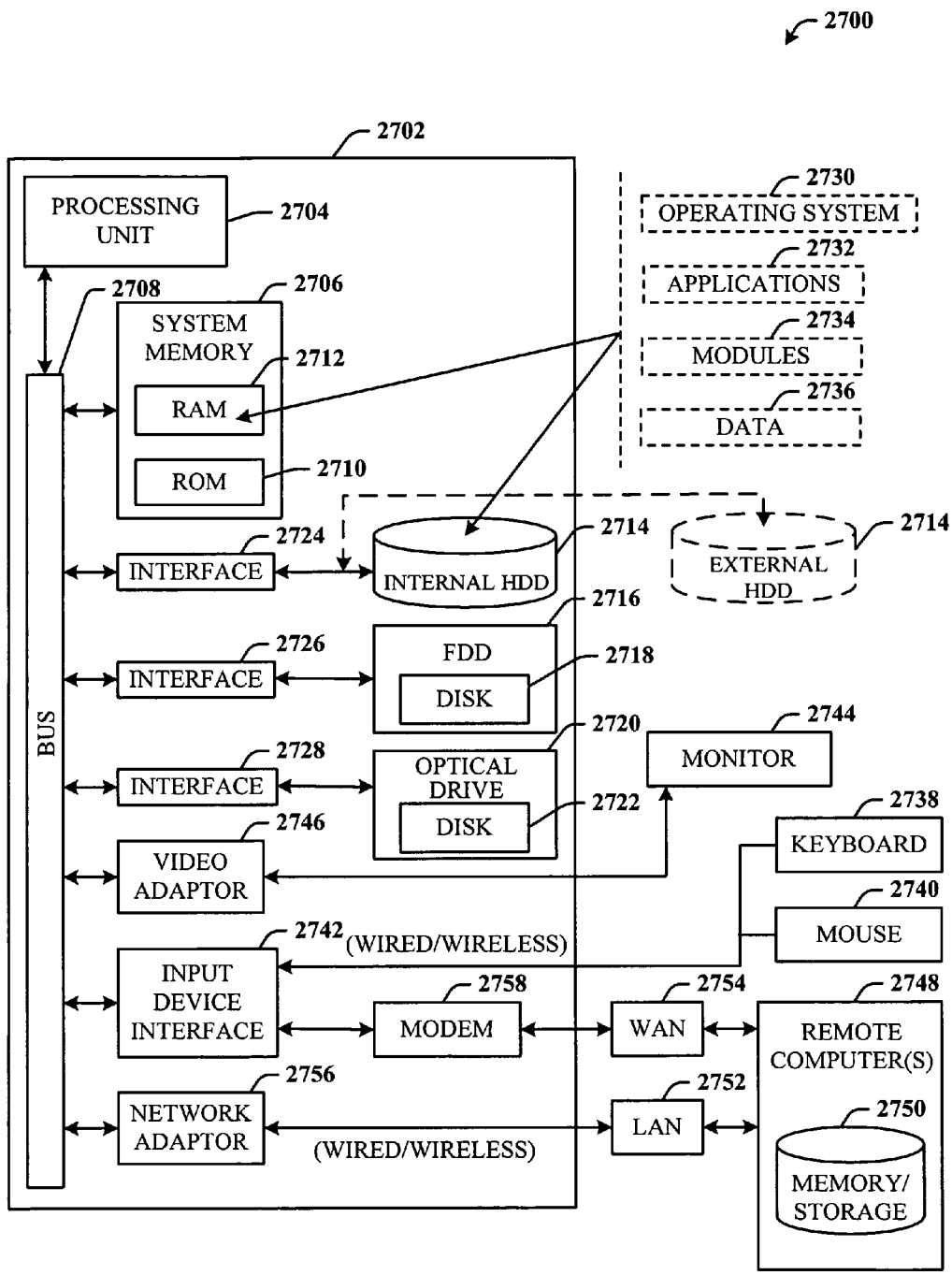
FIG. 27 illustrates a block diagram of a computer operable to execute centralized and distributed conferencing in accordance with the disclosed architecture.

Referring now to FIG. 27, there is illustrated a block diagram of a computer operable to execute centralized and distributed conferencing in accordance with the disclosed architecture. In order to provide additional context for various aspects thereof, FIG. 27 and the following discussion are intended to provide a brief, general description of a suitable computing environment 2700 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 27, the exemplary environment 2700 for implementing various aspects includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures may also be employed as the processing unit 2704.

The system bus 2708 can be any of several types of bus structure that may further interconnect to a memory bus (with or without a memory controller), a peripheral bus, and a local bus using any of a variety of commercially available bus architectures. The system memory 2706 includes read-only memory (ROM) 2710 and random access memory (RAM) 2712. A basic input/output system (BIOS) is stored in a non-volatile memory 2710 such as ROM, EPROM, EEPROM, which BIOS contains the basic routines that help to transfer information between elements within the computer 2702, such as during start-up. The RAM 2712 can also include a high-speed RAM such as static RAM for caching data.

The computer 2702 further includes an internal hard disk drive (HDD) 2714 (e.g., EIDE, SATA), which internal hard disk drive 2714 may also be configured for external use in a suitable chassis (not shown), a magnetic floppy disk drive (FDD) 2716, (e.g., to read from or write to a removable diskette 2718) and an optical disk drive 2720, (e.g., reading a CD-ROM disk 2722 or, to read from or write to other high capacity optical media such as the DVD). The hard disk drive 2714, magnetic disk drive 2716 and optical disk drive 2720 can be connected to the system bus 2708 by a hard disk drive interface 2724, a magnetic disk drive interface 2726 and an optical drive interface 2728, respectively. The interface 2724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 2702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. It is to be appreciated that the innovation can be implemented with various commercially available operating systems or combinations of operating systems.

A user can enter commands and information into the computer 2702 through one or more wired/wireless input devices, for example, a keyboard 2738 and a pointing device, such as a mouse 2740. Other input devices (not shown) may include a microphone, an IR remote control, a joystick, a game pad, a stylus pen, touch screen, or the like. These and other input devices are often connected to the processing unit 2704 through an input device interface 2742 that is coupled to the system bus 2708, but can be connected by other interfaces, such as a parallel port, an IEEE 1394 serial port, a game port, a USB port, an IR interface, etc.

A monitor 2744 or other type of display device is also connected to the system bus 2708 via an interface, such as a video adapter 2746. In addition to the monitor 2744, a computer typically includes other peripheral output devices (not shown), such as speakers, printers, etc.

The computer 2702 may operate in a networked environment using logical connections via wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wired/wireless connectivity to a local area network (LAN) 2752 and/or larger networks, for example, a wide area network (WAN) 2754. Such LAN and WAN networking environments are commonplace in offices and companies, and facilitate enterprise-wide computer networks, such as intranets, all of which may connect to a global communications network, for example, the Internet.

When used in a LAN networking environment, the computer 2702 is connected to the local network 2752 through a wired and/or wireless communication network interface or adapter 2756. The adaptor 2756 may facilitate wired or wireless communication to the LAN 2752, which may also include a wireless access point disposed thereon for communicating with the wireless adaptor 2756.

When used in a WAN networking environment, the computer 2702 can include a modem 2758, or is connected to a communications server on the WAN 2754, or has other means for establishing communications over the WAN 2754, such as by way of the Internet. The modem 2758, which can be internal or external and a wired or wireless device, is connected to the system bus 2708 via the serial port interface 2742. In a networked environment, program modules depicted relative to the computer 2702, or portions thereof, can be stored in the remote memory/storage device 2750. It will be appreciated that the network connections shown are exemplary and other means of establishing a communications link between the computers can be used.

The computer 2702 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 28:
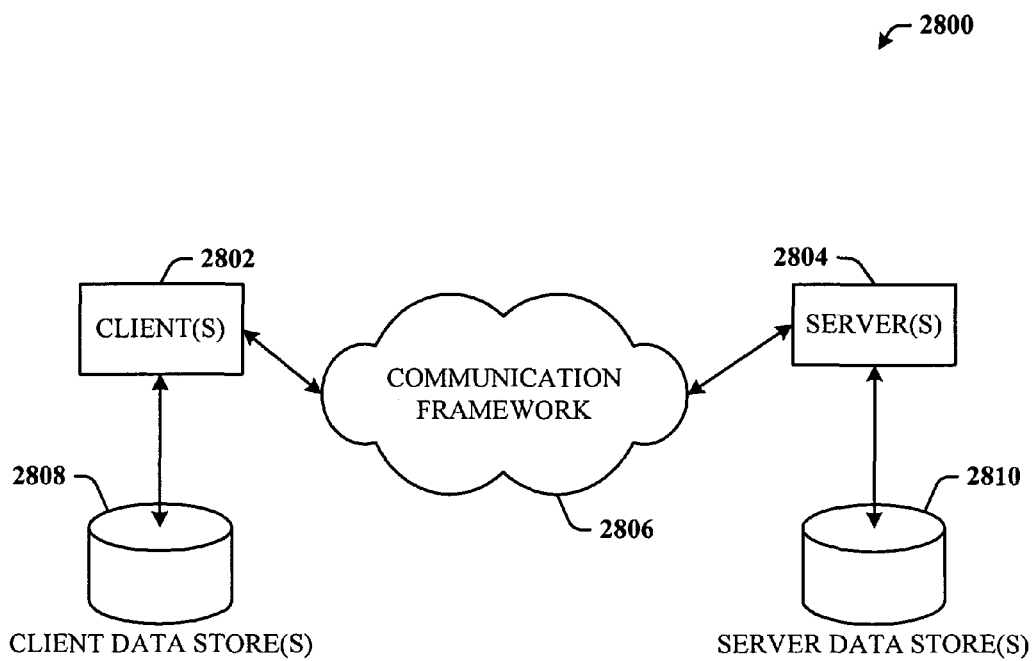
FIG. 28 illustrates a schematic block diagram of an exemplary computing environment that facilitates distributed media conferencing.

Referring now to FIG. 28, there is illustrated a schematic block diagram of an exemplary computing environment 2800 that facilitates distributed media conferencing. The system 2800 includes one or more client(s) 2802. The client(s) 2802 can be hardware and/or software (e.g., threads, processes, computing devices). The client(s) 2802 can house cookie(s) and/or associated contextual information by employing the subject innovation, for example.

The system 2800 also includes one or more server(s) 2804. The server(s) 2804 can also be hardware and/or software (e.g., threads, processes, computing devices). The servers 2804 can house threads to perform transformations by employing the architecture, for example. One possible communication between a client 2802 and a server 2804 can be in the form of a data packet adapted to be transmitted between two or more computer processes. The data packet may include a cookie and/or associated contextual information, for example. The system 2800 includes a communication framework 2806 (e.g., a global communication network such as the Internet) that can be employed to facilitate communications between the client(s) 2802 and the server(s) 2804.

Communications can be facilitated via a wired (including optical fiber) and/or wireless technology. The client(s) 2802 are operatively connected to one or more client data store(s) 2808 that can be employed to store information local to the client(s) 2802 (e.g., cookie(s) and/or associated contextual information). Similarly, the server(s) 2804 are operatively connected to one or more server data store(s) 2810 that can be employed to store information local to the servers 2804.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented conferencing system, comprising:
   a storage device that stores instructions; and
   a processing unit that accesses and executes the instructions, execution of the instructions by the processing unit causing the conferencing system to provide a conference control component in response to a conference set-up request submitted by a client, the conference control component configured to:
   receive the conference set-up request from the client to create a conference session;
   after receiving the request to create the conference session, allocate to the conference session a distributed media component that provides media of the conference session to the client;
   return a uniform resource identifier of the distributed media component to the client after the conference control component allocates the distributed media component to the conference session;
   receive individual state information for each distributed media component from a set of distributed media components that are allocated for the conference session, wherein the state information comprises, at least, policy information associated with the distributed media component;
   generating aggregated state information by aggregating the individual state information for each of the distributed media component from the set of distributed media components allocated for the conference session; and distribute the aggregated state information to each client of the conference session.

2. The conferencing system of claim 1, wherein the distributed media component is a multipoint control unit that accommodates at least one of data, audio signals, video signals, and instant messaging signals.

3. The conferencing system of claim 1, wherein the conference control component provides a policy and roster component that maintains rules that govern operation of the conference session and allow a participant to join the conference session.

4. The conferencing system of claim 1, wherein the conference control component provides an authentication component that imposes security on the conference session by restricting access to the conference session based on participant identity information.

5. The conferencing system of claim 1, wherein the conference control component provides an allocation component that allocates the distributed media component to the conference session.

6. The conferencing system of claim 1, wherein the conference control component provides a scheduling component that schedules the conference session.

7. The conferencing system of claim 1, comprising a conferencing pool of frontend servers each of which runs an instance of the conference session, the pool of frontend servers including the processing unit, the client accessing one of the frontend servers to access the conference session.

8. The conferencing system of claim 7, wherein the conferencing pool of frontend servers includes a load balancer that balances session load among the frontend servers.

9. The method of claim 1, further comprising a notification component for accepting a subscription to the session and notifying changes in state associated with the session.

10. A method of managing a multiparty conference, the method comprising:

receiving a request from a session participant to create a conference session;

providing a conference control component in response to the request, the conference control component configured to:

create and configure the conference session in response to the request;

after receiving the request, assess availability of distributed multipoint control units (MCUs) for media access by the session participant;

after assessing availability of the distributed MCUs, allocate an available MCU to the conference session for session access by the session participant, the available MCU being among the distributed MCUs;

return a uniform resource identifier of the available MCU to the session participant after allocating the available MCU to the conference session;

authenticate participant access to the conference session;

receiving individual state information for each MCU among the distributed MCUs that is allocated for the conference session, wherein the state information comprises, at least, policy information associated with the distributed MCU;

generating aggregated state information by aggregating the individual state information for the MCUs allocated for the conference session; and distributing the aggregated state information to each client of the conference session.

11. The method of claim 10, further comprising maintaining state information of the conference session in a database.

12. The method of claim 10, further comprising updating a session roster based on changes in session participants.

13. The method of claim 10, further comprising associating a URI address with each of the MCUs, the session participant accessing the conference session via one of the MCUs.

14. The method of claim 10, wherein the request is a session initiation protocol (SIP) request.

15. The method of claim 10, further comprising bootstrapping the available MCU into the conference session.

16. The method of claim 10, further comprising joining the available MCU using a dial-in to an MCU URI, a dial-out using the MCU URI, or a direct invite from the available MCU to the MCU URI, the MCU URI identifying the available MCU.

17. The method of claim 10, further comprising initiating an ad hoc invitation to another participant.

18. The method of claim 10, further comprising presenting a single conference view of the conference session via the conference control component.

19. The method of claim 10, further comprising:

accepting subscriptions by clients to the conference session; and notifying subscribed clients to changes in a state associated with the conference session.

20. A storage device encoding computer executable instructions that, when executed by at least one processor, perform a method comprising:

providing a centralized conference control component in response to a conference set-up request submitted by a client, the conference control component configured to:

receive the conference set-up request from the client for initiating a conference session;

create a conference instance for the conference session in response to receiving the request;

create and send an address of the conference session to the client as a response to the request;

allocate a distributed MCU to the conference session after receiving the request, the conference control component allocating the distributed MCU to the conference session based on availability of media types provided by the distributed MCU;

return a uniform resource identifier of the distributed MCU to the client after the conference control component allocates the MCU to the conference session;

manage conference state during the conference session;

notify subscribed clients to changes in a state associated with the conference session;

receive individual state information for each MCU from a set of distributed MCUs that are allocated for the conference session, wherein the state information comprises, at least, policy information associated with the distributed MCU;

generating aggregated state information by aggregating the individual state information for each MCU from the set of distributed MCUs allocated for the conference session; and distribute the aggregated state information to each subscribed client of the conference session.

* * * * *